US012802506B2

(12) United States Patent
Axtolis

(10) Patent No.: US 12,802,506 B2
(45) Date of Patent: Nov. 17, 2026

(54) SECURITY SYSTEM FOR A MOVEABLE BARRIER OPERATOR

(71) Applicant: The Chamberlain Group LLC, Oak Brook, IL (US)

(72) Inventor: Robert Jude Axtolis, Naperville, IL (US)

(73) Assignee: The Chamberlain Group LLC, Oak Brook, IL (US)

( * ) Notice: Subject to any disclaimer, the term of this patent is extended or adjusted under 35 U.S.C. 154(b) by 489 days.

(21) Appl. No.: 18/036,965

(22) PCT Filed: Dec. 27, 2021

(86) PCT No.: PCT/US2021/065227
§ 371 (c)(1),
(2) Date: May 15, 2023

(87) PCT Pub. No.: WO2022/146927
PCT Pub. Date: Jul. 7, 2022

(65) Prior Publication Data

US 2024/0005713 A1 Jan. 4, 2024

Related U.S. Application Data

(60) Provisional application No. 63/196,973, filed on Jun. 4, 2021, provisional application No. 63/132,206, filed on Dec. 30, 2020.

(51) Int. Cl.
*G07C 9/00* (2020.01)
*H04W 12/50* (2021.01)

(52) U.S. Cl.
CPC ..... *G07C 9/00857* (2013.01); *G07C 9/00309* (2013.01); *G07C 9/00896* (2013.01); *H04W 12/50* (2021.01); *G07C 2009/00769* (2013.01); *G07C 2009/00865* (2013.01); *G07C 2009/00888* (2013.01); *G07C 2009/00928* (2013.01); *G07C 2209/06* (2013.01); *G07C 2209/08* (2013.01)

(58) Field of Classification Search
None
See application file for complete search history.

(56) References Cited

U.S. PATENT DOCUMENTS

| | | | | |
|---|---|---|---|---|
| 2001/0017799 A1* | 8/2001 | Chen | G06F 11/348 714/E11.206 |
| 2006/0109978 A1* | 5/2006 | Farris | H04L 9/3226 379/346 |
| 2019/0200225 A1 | 6/2019 | Fitzgibbon | |
| 2020/0043270 A1 | 2/2020 | Cate et al. | |

FOREIGN PATENT DOCUMENTS

| | | |
|---|---|---|
| WO | 2011106199 A1 | 9/2011 |
| WO | 2022146927 A1 | 7/2022 |

OTHER PUBLICATIONS

International Search Report and Written Opinion of the ISA/IL, mailed May 12, 2022, re PCT Application No. PCT/US2021/065227 (9 pages).

* cited by examiner

*Primary Examiner* — Carlos Garcia
(74) *Attorney, Agent, or Firm* — Foley IP Law, PLLC

(57) ABSTRACT

Systems are provided for secure actuation of a device such as a movable barrier operator. The systems permit the device to instruct a control device associated with the device how to proceed in order to allow different types of security protocols depending on the configuration of the control device. Methods of pairing devices are also provided.

20 Claims, 24 Drawing Sheets

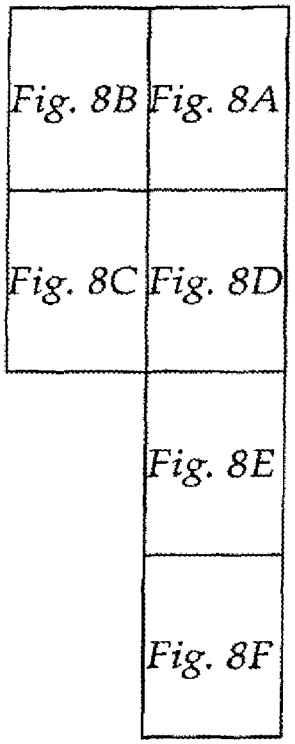
Fig. 8B
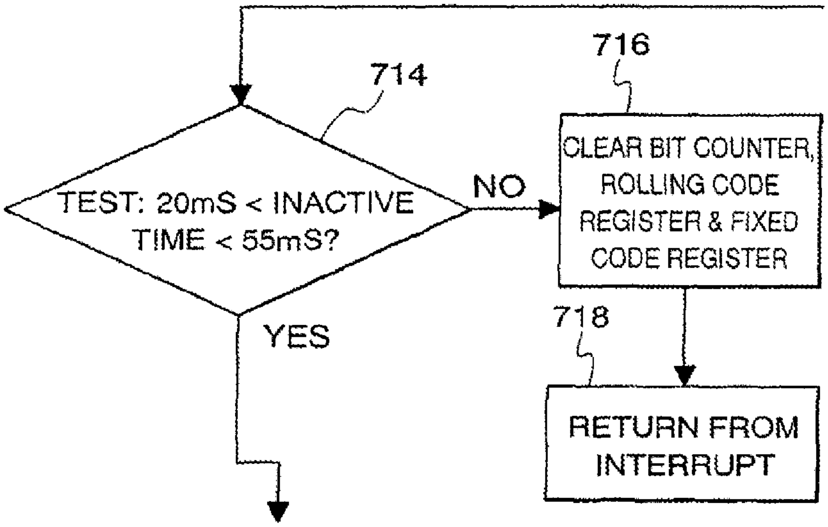

SECURITY SYSTEM FOR A MOVEABLE BARRIER OPERATOR

RELATED APPLICATIONS

This application is a U.S. national phase application filed under 35 U.S.C. § 371 of International Application No. PCT/US2021/065227, filed Dec. 27, 2021, which claims the benefit of U.S. Provisional Patent Application No. 63/132,206, filed Dec. 30, 2020, titled Security System for a Moveable Barrier Operator, as well as U.S. Provisional Patent Application No. 63/196,973, filed Jun. 4, 2021, titled Security System for a Moveable Barrier Operator, which are all hereby incorporated herein in their entireties.

FIELD

This disclosure relates in general to security systems that allow operation upon the receipt of a properly coded signal. More particularly, the disclosure relates to a security system or to a barrier operator system, such as a garage door operator, employing a transmitter and a receiver that communicate via messages or codes, including codes having at least a portion thereof that changes with operations of the transmitter.

BACKGROUND

It is well known in the art to provide moveable barrier operators, such as gate operators, garage door operators, or other barrier operators that include an electric motor connectable through a transmission to a door or other moveable barrier that is to be opened and closed. Because many of these systems are associated with residences, as well as with garages, it is important that opening of the barrier be permitted only by one who is authorized to obtain entry to the area protected by the barrier. Some barrier operator systems have in the past employed mechanical lock and key arrangements associated with electrical switches mounted on the outside of the garage. While these systems enjoy a relatively high level of security against tampering, they are inconvenient to use and may present safety concerns by requiring the user to exit their vehicle to open the barrier.

It is also well known to provide radio-controlled gate or garage door operators, which include an operator unit having a radio receiver and a motor connected to the barrier. The radio receiver is adapted to receive radio frequency signals having particular signal characteristics that, when received, cause the door to be opened. Such systems can include radio transmitters employing coded transmissions of multiple or three-valued digits, also known as "trinary bits" or other serial coded transmission techniques. Among these systems are U.S. Pat. No. 3,906,348 to Willmott, which employs a transmitter and receiver system wherein a plurality of mechanical switches may be used to set a stored authorization code.

U.S. Pat. No. 4,529,980 to Liotine et al. discloses a transmitter and receiver combination for use in a device such as a garage door operator wherein the transmitter stores an authorization code which is to be transmitted to and received by the receiver via a radio frequency link. In order to alter or update the authorization code contained within the transmitter, the receiver is equipped with a programming signal transmitter or light emitting diode which can send a digitized optical signal back to the transmitter where it is stored. Other systems also employing encoded transmissions are U.S. Pat. Nos. 4,037,201, 4,535,333, 4,638,433, 4,750,118 and 4,988,992.

More recently, many moveable barrier operators, for example, garage door operators, use activation codes that change after each transmission. Such varying codes, called rolling access codes, are created by the transmitter and acted on by the receiver, both of which operate in accordance with the same method to predict a next rolling access code to be sent and received. One such rolling type access code includes four portions, a fixed transmitter identification portion, a rolling code portion, a fixed transmitter type identification portion, and a fixed switch identification portion. In this example, the fixed transmitter identification is a unique transmitter identification number. The rolling code portion is a number that changes every transmission to confirm that the transmission is not a recorded transmission. The fixed transmitter type identification is used to notify the moveable barrier operator of the type and features of the transmitter. The switch identification is used to identify which switch on the transmitter is being pressed, because there are systems where the function performed is different depending on which switch is pressed.

Systems are known that comprise code hopping encoders which generate serial codes having fixed portions (i.e., which do not change with repeated actuation of the encoding portion) and rolling code portions which alter with each actuation of a device. In order to avoid inadvertent activation of a transmitter when out of range of the receiver causing the transmitter rolling code to be permanently out of sync with, and therefore not recognized by, a receiver, these code hopping encoders provide a window forward system, that is they are operable with systems having code receivers which recognize as a valid code not a single rolling code, but a plurality of rolling codes within a certain code window or window of values which are the values which would be generated on a relatively small number of switch closures as compared to the total number of rolling codes available. Nevertheless, if a user is away and inadvertently causes codes to be transmitted exceeding the number of codes normally allowed within the valid forward code window, the code will not be recognized by the receiver and the user must circumvent the system, possibly causing inconvenience to the user or requiring a service call.

While security systems have become more sophisticated, persons wishing to gain unauthorized access to commit property or person-related crimes have become more sophisticated as well. It is known in the security industry today that devices are being made available that can intercept or steal rolling code.

Methods also exist for pairing one or more remote control devices with a barrier operator so that one or more users may utilize multiple control devices for use with a single barrier operator or utilize a control device that was not specifically manufactured to be used in conjunction with a specific moveable barrier operator, as in the case of replacement transmitters or transmitters integrated into a vehicle. In existing systems, when a moveable barrier operator is installed, the homeowner typically receives at least one handheld controller that is already trained to the operator. To operate the door from a new secondary control device, there is generally a two-step learning procedure for training the new secondary control device. The first step is to teach the secondary control device the type and potentially the code (or code format/parameters) of the original control device. For instance, while holding the original controller a few inches from the secondary control device, the owner may press and hold the original controller's button at the same time as pressing a learn button on the secondary control device to teach the access code type and frequency to the secondary control device. The second step of the learning process is to train the secondary control device to the operator. To do this, the learn button on the operator is pressed, and within a given time period the secondary control device should be activated. In another prior approach, these two steps are combined into a single step or done simultaneously. In one example, a pre-trained transmitter transmits a code to both an operator and a secondary control device, which both save the code. Next, within a predetermined amount of time, the button is pressed on the secondary control device to transmit a second rolling access code, which is received by the operator and compared with the first rolling-type access code saved in the operator. If a predetermined correlation exists between the first rolling type access code and the second rolling type access code, the operator stores the representation of the second rolling type access code from the secondary control device. Requiring that a user physically possess a pre-trained transmitter to train a secondary control device to a moveable barrier operator according to this approach ensures that the user is authorized to access the garage. Some systems allow a universal control device to learn a credential from a moveable barrier operator by establishing a bidirectional communication between the universal control device and the moveable barrier operator, upon the occurrence of a predetermined event, without the use of a preprogrammed transmitter.

SUMMARY

The present disclosure relates in general to an electronic system for providing security for actuation of a particular device. The system may be useful, for instance, in a moveable barrier operator system such as a garage door operator system by allowing the barrier to be opened and closed while preventing access to the garage without authorization. Moveable barriers for use in connection with the present disclosure may include one-piece and sectional garage doors, pivoting and sliding gates, doors and cross-arms, rolling shutters, and the like. In general, a moveable barrier operator system for controlling such a moveable barrier includes an operator coupled to the corresponding moveable barrier and configured to cause the barrier to move (typically between closed and opened positions) in response to actuation of a controller, such as via a remote control device that communicates with the operator through a wireless technique such as transmission of a radio signal or message at one or more frequencies.

Some systems according to the present disclosure provide enhanced security through bidirectional communication in which first and second devices, such as a control device and a moveable barrier operator, both transmit and receive independent messages or codes to validate a transaction between devices both on the first device end and on the second device end. Some examples of such bidirectional communication and related systems are described in U.S. patent application Ser. No. 16/226,066, the disclosure of which is hereby incorporated by reference as if fully set forth herein. Some embodiments provide enhanced security by linking information relating to timing of subsequent transmissions to the encrypted transmissions, and entail receipt of responsive transmissions within a specified time window as a prerequisite for code validation. These enhanced security measures may also be used in methods of pairing and/or synchronizing devices. In some forms, the barrier operator may determine, based on signals received from a control device or based on specific criteria or settings, that the bidirectional communication protocol should be modified and instruct the controller or operator not to store or validate incoming transmissions to avoid potential problems where a plurality of controllers are used to activate an operator.

In some embodiments, a method may be provided for a first device to effect a communication event and subsequent response by another device. The first device may be, for instance, a handheld or vehicle mounted control device, and may be user-operated or triggered by a geofence, proximity detection, or other factors. The first device may in some forms be generally configured for developing and transmitting via wireless signals a first message, such as an encrypted message comprising a fixed code and a changing or variable code (such as a rolling code). The changing or variable code is, in some forms, changed with each actuation of the control device. The fixed code is, in some forms, static and remains the same for each actuation of the control device. In some forms, one of a plurality of fixed codes may be selected to provide information regarding the state of the device or convey instructions from one device to another. In some aspects, a second device, for example an operator such as a motorized garage door opener, receives the first message from the first device, validates the first message (for example by comparing information associated with the fixed code and the changing or variable code to stored values, which are preferably stored in a computer memory physically incorporated into the second device), and upon validation sends a response signal including at least a second message, such as a second encrypted message having a second fixed code and a second changing code. Information associated with the fixed code and changing/variable code may be, in some forms, the fixed code and changing/variable codes themselves, portions thereof, or information derived from the fixed code and changing/variable codes. In some forms, the first device then receives and attempts to validate the second message, and in some embodiments, the first device is configured to transmit a third message to the second device. The third message may be, for instance, a third encrypted message including the first fixed code and a changed version of the second changing code. This third message is configured to effect performance of an action by the second device, such as lifting, lowering or otherwise moving a moveable barrier.

In some forms, a system of secure communication between a first device and a second device is provided to effect an action by the second device. In some embodiments, the first device comprises a controller circuit; a transmitter in operative communication with the controller circuit; a receiver in operative communication with the controller circuit; and a user input device in operative communication with the controller circuit. In some forms, a single transceiver may be employed rather than a separate transmitter and receiver. The controller circuit of the first device may be configured to, in response to detecting an input at the user input device, control the transmitter to transmit a first encrypted message that includes at least a first fixed code and a first changing code; receive through the receiver a response from the second device, wherein the response comprises a second encrypted message including a second fixed code and a second changing code; validate the response by comparing the second fixed code and the second changing code to second stored information; and in response to validating the response, control the transmitter to transmit a third encrypted message including at least the first fixed code and a changed version of the second changing code, wherein the third encrypted message is configured to effect performance of an action by the second device. The second device may in some embodiments comprise a controller circuit; a transmitter in operative communication with the controller circuit; a receiver in operative communication with the controller circuit; and a timer circuit in operative communication with the controller circuit. The controller circuit of the second device may be configured to enable receiving the first encrypted message by the second device's receiver; validate the first encrypted message by comparing the first fixed code and the first changing code to stored code values; determine when to transmit a response; in response to validating the first encrypted message, control transmitting the response from the second device's transmitter; enable the second device's receiver to receive the third encrypted message; validate the third encrypted message by comparing the first fixed code and the changed version of the second changing code to stored code values; and effect performance of an action in response to validating the third encrypted message.

The fixed and variable codes may be of any selected length and may be adapted or altered in various ways in order to add additional layers of security and/or functionality. In some embodiments, a system may be adaptable to one or more configurations in which a single operator is controlled either by a single transmitter or by a plurality of transmitters. In some forms, the system may include a bidirectional encryption method where each of the transmitter and operator transmit encrypted messages that include unique fixed and changing codes, and in certain forms the bidirectional communication of changing codes may be selectively halted, paused, or bypassed in order to permit a number of transmitters to control a single operator without the operator keeping track of unique sequences of changing code values for each individual transmitter and without causing one or more transmitters to fail to validate communications from the operator due to operator interaction with one or more other transmitters. The ability to engage and disengage bidirectional communication of changing codes is especially useful, for instance, in the case of a moveable barrier for a gated community, private parking garage, apartment complex, or other space in which a plurality of independent residents require access to a single door or gate that is opened and closed by the operator.

Also provided is a method of pairing a first device and a second device to establish secure communication between the first device and the second device. A first device transmits to a second device a first message (such as an encrypted message that includes at least a first fixed code and a first changing code). The second device receives the first encrypted message while the second device is in a "learn" mode in which the second device is waiting for signals from a transmitter without the second device having stored information regarding the current version of the changing code of the first device (or while the second device ignores stored information regarding the changing code of the first device). While in learn mode the second device stores the first encrypted message. In some embodiments, the second device may have been placed in learn mode manually by a user, such as by pressing a button, switch, or lever on the second device, and thus in some embodiments placing the second device in learn mode may entail generally simultaneous manual activation of both the first and second devices. The second device may be configured to terminate learn mode within a specified time window, for instance within five, ten, or twenty seconds of an action that places the second device in learn mode.

The second device transmits its response, comprising a second encrypted message, comprising a unique identifier associated with the second device, to the first device. The second encrypted message may also comprise a second changing code, and may further comprise instructions for the first device regarding whether to store information relating to the identifier associated with the second device. When the responsive second encrypted message is received by the first device, the response (or one or more portions or information derived therefrom) is either stored or not stored in a memory of the first device depending on instructions received from the second device. Subsequently, the first device transmits to the second device a third encrypted message including at least the first fixed code and a changed version of the first changing code. In some cases, the first device may require validation of the second encrypted message, for instance by determining whether the second encrypted message is received within a preset time window. The second device receives and validates the third encrypted message by comparing the first fixed code and the changed versions of the first changing code to stored code information relating to the first encrypted message (e.g. the first fixed code and first changing code, portions thereof, or information derived therefrom), and upon validation (e.g. by confirming that the changed version of the first changing code is one change forward of the changing code from the first encrypted message) the second device then transmits a fourth encrypted message including the second fixed code and a second changing code (which may be independent of the first changing code). The first device receives the fourth encrypted message, and if instructed to do so by the second device, stores information relating to the fourth encrypted message. If the first device has been instructed by the second device not to store information associated with messages from the second device, the first device will receive the fourth encrypted message, and may validate the fourth encrypted message in a manner other than comparing the fourth encrypted message to a prior stored message, but will not store information relating to the fourth encrypted message.

In some forms, a method of pairing a control device and an operator device that has been placed in a learning mode is provided wherein the control device transmits a first encrypted message that includes at least a first fixed code and a first changing code; the operator device receives the first encrypted message while the operator device is in a learning mode, stores the first encrypted message, determines whether the control device should store information from a second encrypted message based on at least a portion of the first encrypted message, and transmits a response from the operator device comprising the second encrypted message and instructions regarding storing of information associated with the second encrypted message (e.g. a second fixed code and/or second changing code). The instructions transmitted by the operator device may, for instance, instruct the control device to ignore the second encrypted message, avoid storing the encrypted message or parts thereof, store the encrypted message, or proceed with preset or default protocol. In this manner, the operator device may proceed with bidirectional encrypted validation (in which both the control device and operator device send encrypted messages and analyze at least one encrypted message from the other device) with certain control devices and unidirectional encrypted validation (wherein only the operator device analyzes encrypted messages) with other control devices without a completely separate communication protocol or pathway.

In certain embodiments, the operator device makes a decision regarding whether to proceed with unidirectional or bidirectional encrypted communication based on the type of control device, the type of signal transmitted by the control device, and/or an identification code transmitted by the control device. For instance, the operator device may perform a step of determining whether the control device will store information based on a classification of the control device (e.g. the type or configuration of control device communicating with the operator device) based on information relating to the first encrypted message (e.g. the first fixed code, a portion thereof, or information derived therefrom), based on a separate encrypted or unencrypted signal received from the control device, or based on other factors or criteria. In some forms, the operator device may instruct the control device regarding storing information via an instruction portion of the second encrypted message, or alternatively send a separate instruction message or payload. The instruction portion or instruction message may, for instance, in some forms comprise either an instruction to store the second fixed code and second changing code, an instruction not to store the second fixed code and second changing code, or an omission of a specific instruction so that the control device proceeds with a default protocol or pathway.

If the instructions from the operator device result in the control device not storing information associated with the second encrypted message (such as the second encrypted message itself, the second fixed code and second changing code of the second encrypted message, one or more portions thereof, or information derived therefrom), the control device will transmit to the operator a third encrypted message including at least the first fixed code and a changed version of the first changing code, the operator device will receive and compare the first fixed code and the changed version of the first changing code to stored code values from the first encrypted message. If the third encrypted message is validated based on comparison of the first fixed code and the changed version of the first changing code to stored code values, for instance by comparing the changed version of the first changing code to an expected value derived from stored code values, then the operator will transmit to the controller a fourth encrypted message including the second fixed code and a second changing code, resulting in pairing of the devices. The fourth encrypted message may include instructions regarding storing the fourth encrypted message, one or more portions thereof, or information derived therefrom.

In similar fashion, a method of operating a control device to effect an action by a an operator device may be provided wherein the operator chooses between bidirectional encrypted communication and unidirectional encrypted communication based on a classification of the first device (e.g. the type or configuration of control device communicating with the operator device), based on at least a portion of the first encrypted message (e.g. the first fixed code or a portion thereof), based on a separate signal received from the control device, or based on other factors or criteria. For instance, in some forms the control device transmits a first encrypted message that includes at least a first fixed code and a first changing code; the operator device receives the first encrypted message, stores information relating to the first encrypted message, determines whether to instruct the control device to validate a response from the second device based on at least a portion of the first encrypted message; and transmits a response to the control device comprising a second encrypted message including a second fixed code and second changing code, as well as instructions regarding validating the second fixed code and/or second changing code. The instructions regarding validating the second fixed code and/or second changing code may be part of the same transmission as the second encrypted message, or alternatively may be contained in a separate transmission. If the control device is instructed not to validate the second encrypted message, the control device will transmit to the operator a third encrypted message including at least the first fixed code and a changed version of the second changing code to be validated by the operator, and if the operator validates the third encrypted message the operator will effect a programmed action such as moving a physical barrier.

In some forms, the present disclosure relates to an apparatus configured to effect an action upon communication with a control device, the apparatus comprising a controller circuit, as well as a transmitter and receiver (or transceiver in place of a separate transmitter and receiver) in operative communication with the controller circuit, wherein the controller circuit is configured to (a) control the receiver to receive a first encrypted message from the control device that includes at least a first fixed code and a first changing code, (b) control the transmitter to transmit a response to the control device, the response comprising a second encrypted message and instructions for the remote device regarding whether to attempt to validate the second encrypted message. In some forms, the second encrypted message and instructions regarding whether to attempt to validate the second encrypted message may be parts of a single transmission, and in other forms may be conveyed in multiple transmissions. In some forms, a portion of the second encrypted message instructs the device whether to validate the second encrypted message or portions thereof. The controller circuit of the apparatus may, in some forms, further control the receiver to receive a third encrypted message from the remote device sent in response to receipt of the second encrypted message, the third encrypted message including at least the first fixed code and a changed version of the second changing code. In some forms, the controller circuit may be further configured to effect performance of an action by the apparatus, such as opening or closing a physical barrier such as a garage door or gate, based on a comparison of at least a portion of the third encrypted message to stored code values.

Some forms of the present disclosure may include a non-transitory computer readable medium having stored thereon instructions that when executed by a controller circuit of a second device cause the controller circuit to perform operations of communicating with a first device to effect an action by the second device, the operations comprising receiving from the first device a first encrypted message that includes at least a first fixed code and a first changing code; determining by the second device, based on information relating to at least a portion of the first encrypted message, whether to instruct the first device to validate a response from the second device; transmitting the response from the second device, wherein the response comprises a second encrypted message including a second fixed code and second changing code, at least a portion of the second encrypted message instructing the first device regarding validating the second fixed code and second changing code; receiving by the second device a third encrypted message including at least the first fixed code and a changed version of the second changing code; and effecting performance of the action by the second device upon comparing at least a portion of the third encrypted message to stored code values.

In some embodiments, a simplified pairing function is also provided in which an operator or other device is provided in a "pre-learn" configuration in which the device is ready to engage in a learning protocol upon communication from another device without being set in a learning mode (such as by actuation of a manual DIP switch or the like to a "learn" position). This simplified pairing function can reduce the burden on the manufacturer by eliminating pairing steps normally conducted by the manufacturer, speeding up production. This can be especially advantageous in certain instances for systems involving bidirectional learning where each device learns the other by storing and validating fixed and/or variable codes associated with the other device. In some aspects, a manufacturer performs one or more steps to place a device in a "pre-learn" configuration, and then a user or purchaser of the device actuates another device to automatically initiate the pairing function. This reduces the time spent pairing devices by the manufacturer and allows an end user to pair the devices with, for example, a single action, such as a single push of a button of a control device such as a transmitter sold with the operator.

In the pre-learn configuration, a device such as an operator may be configured to automatically store a first variable code transmitted with a first fixed code and received by the operator due to actuation of another device such as a control device, subject to validation of only the fixed code by confirming that the first variable code matches a preset fixed code stored in a memory of the operator. The operator then provides a response that comprises a second fixed code associated with the operator, and also in some forms a learning variable code or other information confirming to the controller that the operator is in a learning mode, initiating a learning protocol between the control device and operator. Upon completion of the learning process, the operator exits the pre-learn configuration to prevent inadvertent activation of the learning process.

BRIEF DESCRIPTION OF THE DRAWINGS

FIGS. 8A-F are flow charts showing examples of operation of a receiver of one of the first and second devices;

Figure 1:
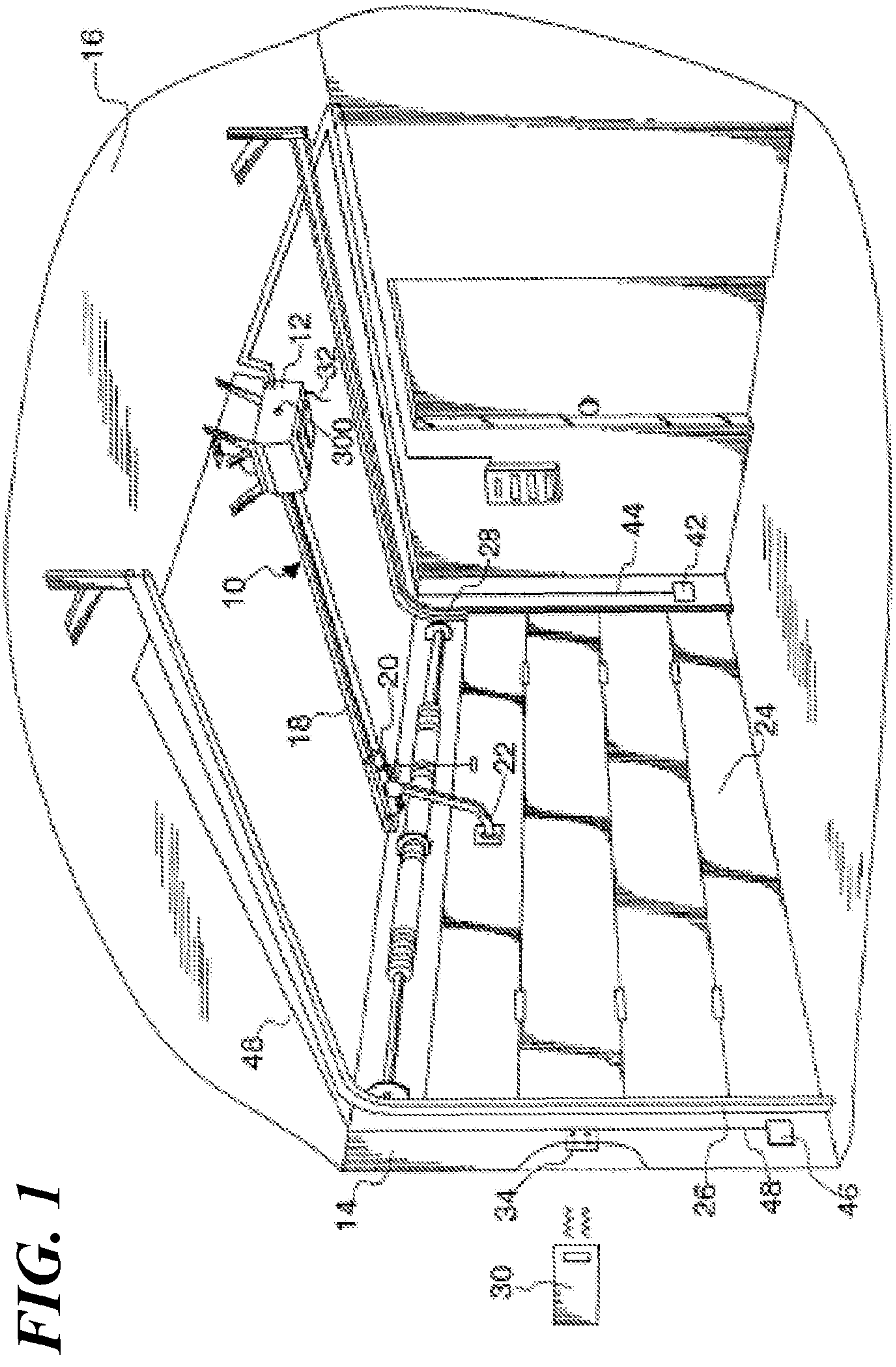
FIG. 1 is a perspective view of an example moveable barrier operator system that receives control signals from a user-operated control device.

Skilled artisans will appreciate that elements in the figures are illustrated for simplicity and clarity and have not necessarily been drawn to scale. Common but well-understood elements that are useful or necessary in a commercially feasible embodiment may be omitted for simplicity and/or clarity. It will further be appreciated that certain actions and/or steps may be described or depicted in a particular order of occurrence while those skilled in the art will understand that such specificity with respect to sequence is not actually required.

DETAILED DESCRIPTION

In some forms, the systems and methods described herein may include a user-actuated first device, for instance a handheld or vehicle mounted control device, generally configured for developing a first encrypted message comprising a fixed code and a changing or variable code (such as a rolling code). The changing or variable code may be changed with each actuation of the control device according to a set sequence or protocol accessible by the first device and a second device with which it communicates. The fixed code remains the same for each actuation of the first device. The second device may comprise an operator mechanism, such as a motorized barrier (e.g. garage door or gate) opener, to induce one or more actions when commanded by the first device. The first and second device may be configured to communicate with one another by various techniques, for example a wired communication path, radio frequencies, or any variety of proprietary wireless platforms.

In certain embodiments, the second device receives the encrypted message from the first device, validates the message by comparing the fixed code and changing or variable code to stored information and, upon validation, sends a response signal including at least a second encrypted message having a second fixed code and a second changing code that is independent from the first changing code. The stored information may represent, for instance, fixed and changing values from prior operations with a sequence or algorithm associated with the changing code to determine changing code values. In some embodiments, the second device may recognize a plurality of changing code values as valid in order to account for accidental or otherwise ineffective actuation of the first device (such as when outside of the range of the second device or when interference prevents normal communication with the second device.)

In some forms, the second device can determine, based on preset conditions, whether the first device should validate subsequent communications from the second device to the first device. For instance, in some cases the first device is in a default state wherein the first device receives and attempts to validate the second encrypted message, and upon validation is configured to transmit a third encrypted message to the second device, the third encrypted message including the first fixed code and a changed version of the second changing code. However, if the second device determines that the first device should not proceed in the default state, the second device may transmit a signal instructing the first device to initiate an alternative protocol in which the first device receives the second encrypted message without storing any information associated with the second encrypted message and without attempting to validate the second encrypted message. This alternative protocol prevents failure of validation in situations where one or more alternative devices besides the first device are used in connection with the second device and have initiated actions with the second device that could cause a changing code portion of the second encrypted message from the second device to not match expected values determined from values stored in a memory of the first device. In other words, the alternative protocol is configured to be triggered under circumstances where the second device may have changed its changing code one or more times in response to interactions with authorized devices other than the first device, for instance where the second device is a moveable barrier operator for an apartment complex, condominium association, gated community, or other multi-unit dwelling area where a plurality of independent users have access to a given entry point and each utilize different remote control devices for activating the moveable barrier operator.

The third encrypted message, sent by the first device in response to validation of the second encrypted message or in response to receipt of instructions from the second device to initiate the alternative protocol, is configured to effect performance of an action by the second device, such as lifting, lowering, sliding, pivoting, opening, closing or otherwise moving a movable barrier upon validation by the second device based on comparisons to stored information. Alternatively, the communication between the devices may, in some embodiments, involve additional exchanges of messages prior to effecting performance of an action by the second device in order to further improve security, for instance transmission and validation of fourth and fifth encrypted messages containing fixed codes and changing codes The ability of the second device to instruct the first device to proceed either in a default protocol or in an alternative protocol permits communication between the devices to involve bidirectional validation of messages wherein each of two devices are configured to both transmit and receive messages and compare the messages to stored information (such as values from prior communications between devices) where maximum security is desired or, alternatively, unidirectional validation of messages originating only from one device where one device is required to interact with numerous other devices. The alternative protocol allows the second device, such as a moveable barrier operator device, to utilize either bidirectional or unidirectional validation systems as desired without the need to reconfigure the device or actively switch the operator via human intervention from the default protocol to the alternative protocol and vice versa. Activation of an alternative protocol also allows one or more remote control devices to be exempt from the bidirectional validation protocol without the need for the operator to store independent changing code values or sequences for each exempt control device, thus allowing for the operator to be paired to tens, hundreds, or even thousands of devices without requiring unduly large amounts of memory space to store information relating to thousands of prior interactions with the control devices. The second device may determine whether to instruct the first device to proceed with the default protocol or alternative protocol based on any desired criteria. For instance, the second device may have stored in its memory a list of device types, models, codes, or characteristics that qualify certain devices for the alternative protocol. For instance, in some forms the second device will, upon receipt of a transmission from the first device, compare one or more pieces of transmitted information to information stored in a database in order to determine the appropriate protocol for the second device, and then transmit information to the first device instructing the first device to proceed with the appropriate protocol. In some forms, the second device determines how to instruct the first device by comparing a fixed code, or a portion thereof, transmitted by the first device to the second device against stored information. In other forms, the second device is configured to determine the appropriate protocol based on the length of a message received from the first device, the format of the message received from the first device, a separate signal transmitted by the first device within a specified time window of an encrypted message, or other factors. The instruction from the second device to the first device relating to the protocol with which the first device is to proceed may likewise take a number of forms. For instance, the first device may default to a bidirectional validation state and change to an alternative unidirectional validation state only upon receipt of a valid instruction from the second device. Alternatively, the first device may default to a unidirectional validation state and change to an alternative bidirectional validation state only upon instruction from the second device. In some forms, the first device may not have a default protocol such that the first device depends on the second device to provide instructions for one of a plurality of protocols. And in some other forms, the second device does not transmit an instruction to the first device, for instance where the first device is preconfigured to operate in a specific state or where the first device determines the appropriate protocol.

In some embodiments, at least one time window is associated with one or more of the encrypted messages to provide an additional layer of security and minimize the opportunity for third parties to intercept transmissions and utilize the fixed and changing codes without the device owner's consent. For instance, in some such embodiments where a time window is associated with the first exchange of encrypted messages, upon actuation the first device determines a time window in which to expect to receive a response as it transmits the first encrypted message including at least a first fixed code and a first changing code. In some embodiments, the time window may be determined at least in part based on one or more portions of the encrypted message, so that the time window itself acts as an additional layer of encryption. For instance, specific lengths of time may be associated with specific values or digits in the fixed code portion of the message so that a specific time window is linked to the first device or associated with specific values or digits in the changing code portion of a message so that the time window varies with each actuation of the first device. The second device receives the encrypted message and validates the message by comparing the fixed code and changing or variable code to stored values. The second device then determines a second time window in which to transmit a response to the user-operated transceiver based on the encrypted message, with the second time window being the same as or within the time window determined by the first device and may or may not be determined using the same portion of the encrypted message. In some embodiments, the second time window may be a discrete point in time, with or without a margin of error, that lies within the first time window. When the second device validates the encrypted message, the second device then sends a response signal within the second time window. The response signal includes a second encrypted message, which may be, for instance, a message comprising a second fixed code and a second changing code that is independent from the first changing code. The first device may be configured to ignore responses received by the first device outside of the first time window but validate responses received within the time window calculated by the first device, thus allowing timing of response signals from the second device to act as an additional layer of security verifying that the devices are authorized to communicate with one another. If the second encrypted message is received by the first device within the first time window, the user-operated device will validate the second encrypted message by comparing its fixed code and changing or variable code to a set of stored code values. The first device may compare the time of receipt of the second encrypted message to the first time window, only proceeding to analyze signals which are received within the first time window. Alternatively, in order to conserve power the first device transceiver may turn on and enable a receiver of the first device to receive transmissions only within the first time window so that the second encrypted message will be entirely ignored if sent and received outside of the first time window. In some embodiments, the time window is less than about 360 milliseconds, and in some embodiments, begins tens or hundreds of milliseconds after the time window is determined by the first device. The time window is preferably short enough so that there is no noticeable delay to the user between actuating the transmitter device and causing the requested action.

Referring now to the drawings and especially to FIG. 1, a moveable barrier operator system 10 is provided that includes moveable barrier operator 12 mounted within a garage 14 and a handheld transceiver or control device 30. The operator 12 is mounted to the ceiling 16 of the garage 14 and includes a rail 18 extending therefrom with a releasable trolley 20 attached having an arm 22 extending to a multiple paneled garage door 24 positioned for movement along a pair of door tracks 26 and 28. The handheld transceiver unit 30 is adapted to send signals to and receive signals from the operator 12. An antenna 32 may be positioned on the operator 12 and coupled to a receiver as discussed hereinafter in order to receive transmissions from the handheld control device 30. An external control pad 34 may also be positioned on the outside of the garage 14 having a plurality of buttons thereon and communicate via radio frequency transmission with the antenna 32 of the operator 12. An optical emitter 42 may be connected via a power and signal line 44 to the operator 12 with an optical detector 46 connected via a wire 48 to the operator 12 in order to prevent closing of the door 24 on a person or object inadvertently in the door's path. An input such as a button or switch 300 may be provided for switching the operator between modes, such as operating mode and learn mode.

Figure 2:
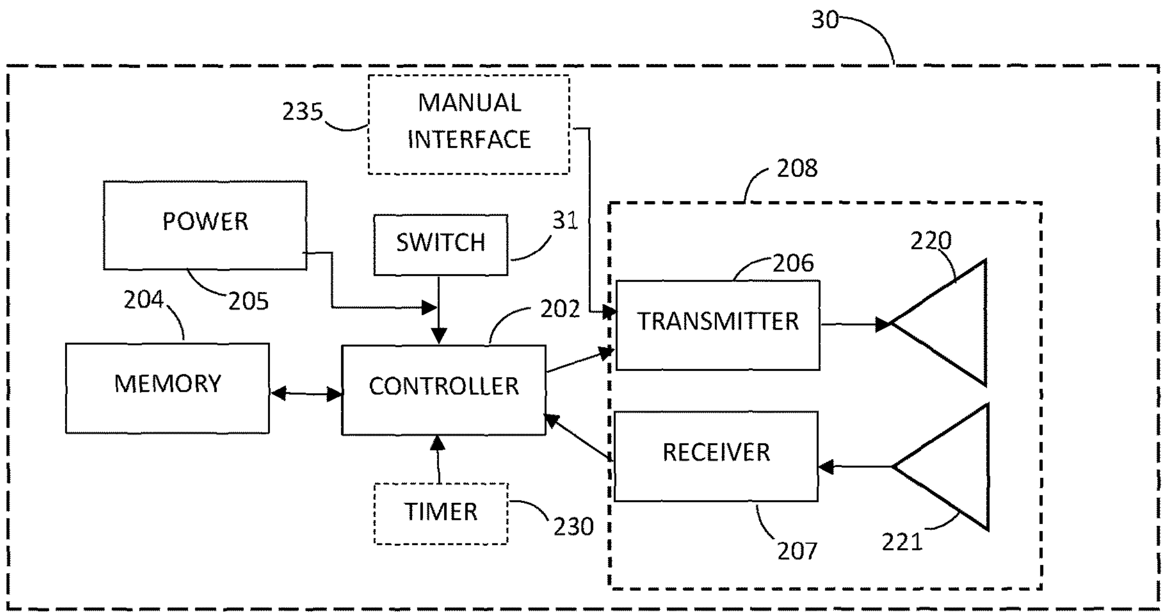
FIG. 2 is a block diagram of an example of the user-operated control device of FIG. 1.

Referring now to FIG. 2, a block diagram of the control device 30 is provided. The control device 30 includes a communication circuit 208 comprising both a transmitter 206 and receiver 207 (which may be combined into a single transceiver mechanism) in operative communication with antennas 220 and 221, respectively. The antennas may be positioned in, on, or extending from the user operated control device 30, wherein the transmitter 206 and receiver 207 are configured for wirelessly transmitting and receiving transmission signals to and from the moveable barrier operator 12, including transmission signals that contain a first rolling access code with a fixed code portion and a rolling code portion. In some embodiments, both the transmitter and receiver may communicate with a single antenna or multiple antennas, and in some embodiments the transmitter and receiver may be configured to be a single transceiver device in communication with a single antenna. The user-operated control device 30 also includes a controller 202 in operative communication with the transmitter 206 and a memory 204 and is configured for processing data and carrying out commands. The memory may be, for instance, a non-transitory computer readable medium, and may have stored thereon instructions that when executed by a controller circuit cause the controller circuit to perform operations. A power source 205 is coupled to the controller 202 and/or other components, and may be routed in some embodiments so that a user interface, such as switch 31, couples/decouples the power source to other components so that power is supplied only upon activation of the switch 31 or a specified time thereafter. The controller 202 is configured to generate and cause the transmitter 206 to transmit a first rolling access code, including at least one fixed code portion and at least one changing or rolling code portion for the transmission signal, and the receiver 207 is configured to receive responsive transmissions. Optionally, a timer 230 in communication with the controller 202 provides a way to determine the time of incoming and outgoing signal transmissions, and provides reference for the controller 202 to enable and disable the transmitter 206 and/or receiver 207 of the device. In some embodiments, a manual setting interface 235 may be provided, which in some forms may include one or more DIP switches or other devices configured to allow a user to configure a setting or state of the controller 202. The manual setting interface 235 may be operatively coupled to the transmitter in order to allow transmission of a payload conveying information regarding the current setting or state of the manual setting interface. The memory 204 is connected for operative communication with the controller 202 and is configured to store codes and in some embodiments other information for outgoing transmissions. The memory 204 is further configured to store fixed and/or changing or variable code information for comparison to incoming transmissions. The switch 31 may include one or more user-operable switches for inputting commands to the controller 30, for example to issue a barrier movement command or a learning command. The switch 31 may be associated with a button, lever, or other device to be actuated, for example by a user's hand or other actions, events, or conditions. As other examples, the switch 31 may be voice operated or operated by a user contacting a touch-sensitive screen as the location of an object displayed on the screen.

Figure 3:
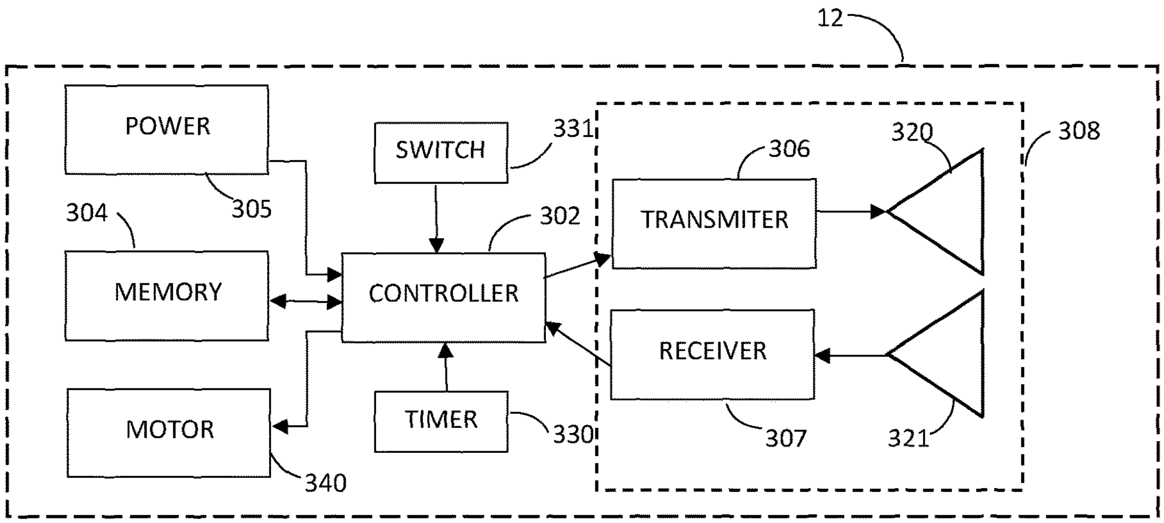
FIG. 3 is a block diagram of an example of the moveable barrier operator of the system of FIG. 1.

Referring now to FIG. 3, in one example, the operator 12 includes a controller 302 in communication with a memory 304 and is configured for storing and retrieving data to and from the memory 304 as well as processing data and carrying out commands. A power source 305, such as an AC power conduit, battery, or other known source, supplies electricity to the controller 302 in order to allow operation. As an example, the power source 305 may include an AC power conduit, a power conditioning circuit, a battery, and a battery charging circuit. The operator 12 also includes a communication circuit 308 comprising a wireless transmitter 306 and receiver 307 (or combination transceiver device) in operative communication with the controller 302. As shown, the transmitter 306 communicates with a first antenna 320 and the receiver communicates with a second antenna 321, but both devices may communicate with a single antenna or multiple antennas, and in some embodiments the device may be configured to have a single transceiver device in communication with a single antenna. The antennas may be positioned in, on, or extending from the moveable barrier operator 12. In this regard, signals, such as radio frequency or other wireless transmission carriers, may be sent to and received from the user-actuated control device 30 according to a variety of frequencies or modulations. Signals may be modulated in a number of different ways; thus, the control device 30 and moveable barrier operator 12 may be configured to communicate with one another via a variety of techniques. The controller 302 of the operator device 12 is also in communication with an actuator such as a motor 340 in order to carry out an operation such as lifting or lowering a garage door; sliding, swinging, or rotating a gate; or otherwise moving or repositioning a barrier structure. One or more switches 331 or buttons/keys constituting a user input may be provided to override the controller 302 or place the controller in and out of a learning mode in which the operator 12 may be paired with a user-operated device by exchanging and storing messages.

The term controller refers broadly to any microcontroller, application specific integrated circuit (ASIC), field programmable gate array (FPGA), computer, state machine, or processor-based device with processor, memory, and programmable input/output peripherals, which is generally designed to govern the operation of other components and devices. It is further understood to include common accompanying accessory devices. The controller can be implemented through one or more processors, microprocessors, central processing units, logic, local digital storage, firmware, software, and/or other control hardware and/or software, and may be used to execute or assist in executing the steps of the processes, methods, functionality, and techniques described herein. Furthermore, in some implementations the controller may provide multiprocessor functionality. These architectural options are well known and understood in the art and require no further description here. The controllers may be configured (for example, by using corresponding programming stored in a memory as will be well understood by those skilled in the art) to carry out one or more of the steps, actions, and/or functions described herein.

Generally, the controllers 202 and 302 may be configured similarly or independently, and each can include fixed-purpose hard-wired platforms or can comprise a partially or wholly programmable platform. These architectural options are well known and understood in the art and require no further description here. The controller can be configured (for example, by using corresponding programming as will be well understood by those skilled in the art) to carry out one or more of the steps, actions, and/or functions described herein, and can store instructions, code, and the like that is implemented by the controller and/or processors to implement intended functionality. In some applications, the controller and/or memory may be distributed over a communications network (e.g. LAN, WAN, Internet) providing distributed and/or redundant processing and functionality. In some implementations, the controller can comprise a processor and a memory module integrated together, such as in a microcontroller. One or more power sources may provide power to each controller, and may be of any known type.

When a user actuates the switch 31 of the user-operated control device 30, such as by pressing a button designated as performing a particular action, the controller 202 activates the transmitter 206 to transmit through antenna 220 a message based on information stored in the memory 204. The message is received by the receiver 307 of the operator device 12, and communicated to the operator's controller 302. In some embodiments, the controller 302 verifies the message by comparing the message to stored information from the operator's memory module 304, and upon verification the controller 302 is configured to cause transmission of a response signal from the transmitter 306 through antenna 320. If the message from the user-actuated control device 30 includes information relating to timing parameters for a response, the operator's controller 302 receives time information from a timer 330 in order to determine when to transmit the response in order to comply with timing parameters of the user-actuated control device 30.

The user-actuated control device 30 may be configured to verify that the response from the operator 12 complies with transmitted timing requirements in any number of ways. In some embodiments, the controller 202 may compare a time stamp or other timing information relating to the operator's response to the transmitted time parameter using timer 230. In some embodiments, receiver 207 is generally inactive, but switched on by controller 202 only for a short time period consistent with the transmitted timing parameter. For instance, controller 202 may switch on receiver 207 for a window of time matching a time window transmitted in an outgoing message through transmitter 206, and upon expiration of the time window according to timer 230, controller 202 switches receiver 207 off again. Timing information may be either relative, for instance a specified number of seconds, milliseconds, or nanoseconds after transmission of an outgoing signal or other event, or may be absolute such as standard date and time information for a specific time zone. A timing synchronization protocol may be provided in some forms in order to maintain precision of timing with other devices despite drift or other factors.

Upon receiving the response of the operator 12 through receiver 207 at an appropriate time consistent with the specified timing parameter, the user-actuated control device 30 may validate the response by comparing it to stored information in the memory 204. Upon validation of the response, the user-actuated device 30 may transmit another message through transmitter 206 to the operator 12. This third message is configured to cause the operator's controller 302 to effect performance of an action, particularly to activate the motor 340 in order to carry out a function associated with activation of the user-actuated device. The control device 30 may include multiple buttons, levers, switches, displays, microphone(s), speaker(s), or other inputs associated with different tasks to be carried out by the operator 12. As one example, the control device 30 has a plurality of mechanical buttons that each operate a respective switch 31. As another example, the control device 30 includes a display with one or more virtual buttons.

In another example, pairing of the movable barrier operator 12 to a user-actuated control device 30 may be performed. The receiver 307 of the operator 12 is configured to receive an authorization signal indicating that the operator 12 is authorized to communicate with the control device 30 and to provide an indication that it received the authorization signal to the controller 302. One or more switches 331 may be provided in order to turn on and/or otherwise permit the receiver 307 to receive the authorization signal. In response to receiving the authorization signal, the controller 302 is configured to generate a first rolling access code and to store a representation of the first rolling access code in the memory device 304. The controller 302 is configured with the transmitter 306 to transmit a transmission signal including the first rolling access code to the user-actuated device 30. The receiver 307 also receives a transmission signal from the user-actuated control device 30 including a second rolling access code, as described further below. In this example, the receiver 307 provides the transmission signal to the controller 302, which compares the second rolling access code with the representation of the first rolling access code stored in the memory device 304.

Figure 4:
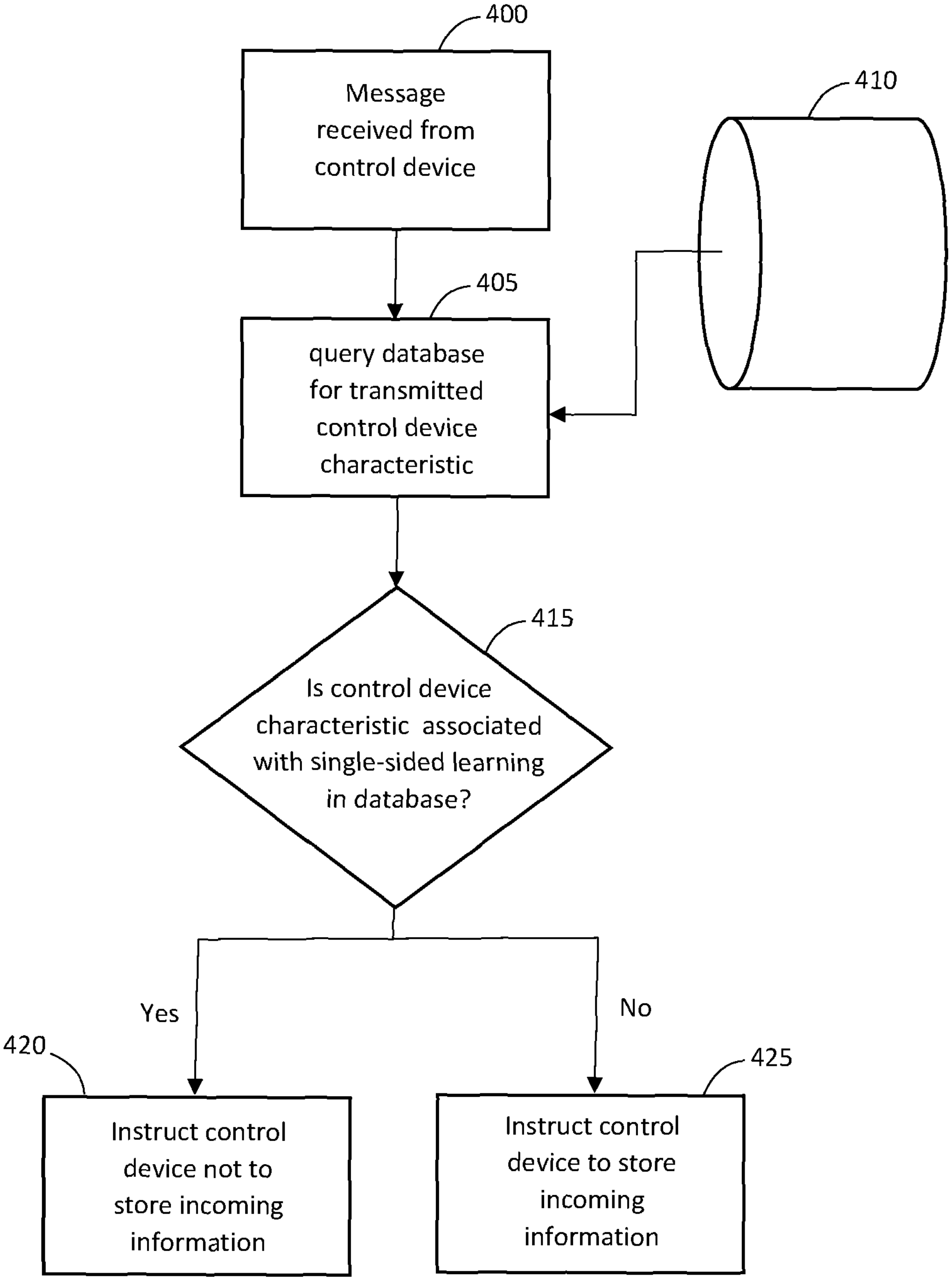
FIG. 4 is a flow diagram illustrating an example of a process for determining whether to instruct another device with a single-sided learning protocol or a dual-sided learning protocol.

FIG. 4 is a flow chart that demonstrates one example of a decision-making process of an operator consistent with some embodiments of the present disclosure. In this example, an operator is set to a learning mode, for instance by pressing a button or moving a switch to a "learn" position. At step 400 a message is then received by the operator upon activation of a control device. At step 405, the operator then compares information from the received message to information from a database 410 (which may be stored in a memory of the operator, in the memory of a server device accessible by the operator, in a network storage accessible by the operator, in a cloud-based platform, or in any other location accessible by the operator), for example by receiving information regarding a device characteristic from the message and locating the characteristic in an index or lookup table to determine if the characteristic is associated with single sided learning (step 415). The characteristic of the control device may be, for instance, a fixed value or code transmitted by the device, a code or value associated with a current state of the device (for example a code or value transmitted when a DIP switch is set to a position that corresponds to single-sided communication), information derived from a transmitted message or the format of a transmitted message, or other information representative of some aspect of the control device. If the operator determines that the database 410 associates the control device characteristic received by the operator with single-sided learning process, the operator will instruct the control device to avoid storing one or more subsequent pieces of information transmitted from the operator to the control device (step 420) in order to turn off or bypass bidirectional validation of transmitted signals. On the other hand, if the operator determines that the database 410 does not associate the control device characteristic received by the operator with single-sided learning process, the operator will instruct the control device to store subsequent information transmitted from the operator to the control device (step 425). The instructions may be configured in any desired manner. For instance, an instruction not to store incoming information 420 may be an active transmission of information that causes the control device to ignore certain subsequently received information, or may alternatively be a withholding of certain instructions if the default state of the control device is to avoid storing information received from the operator. Likewise, an instruction to store incoming information 425 may be an active transmission of information that causes the control device to store certain subsequently received information, or may alternatively be a withholding of certain instructions if the default state of the control device is to avoid storing information received from the operator.

Figure 5A:
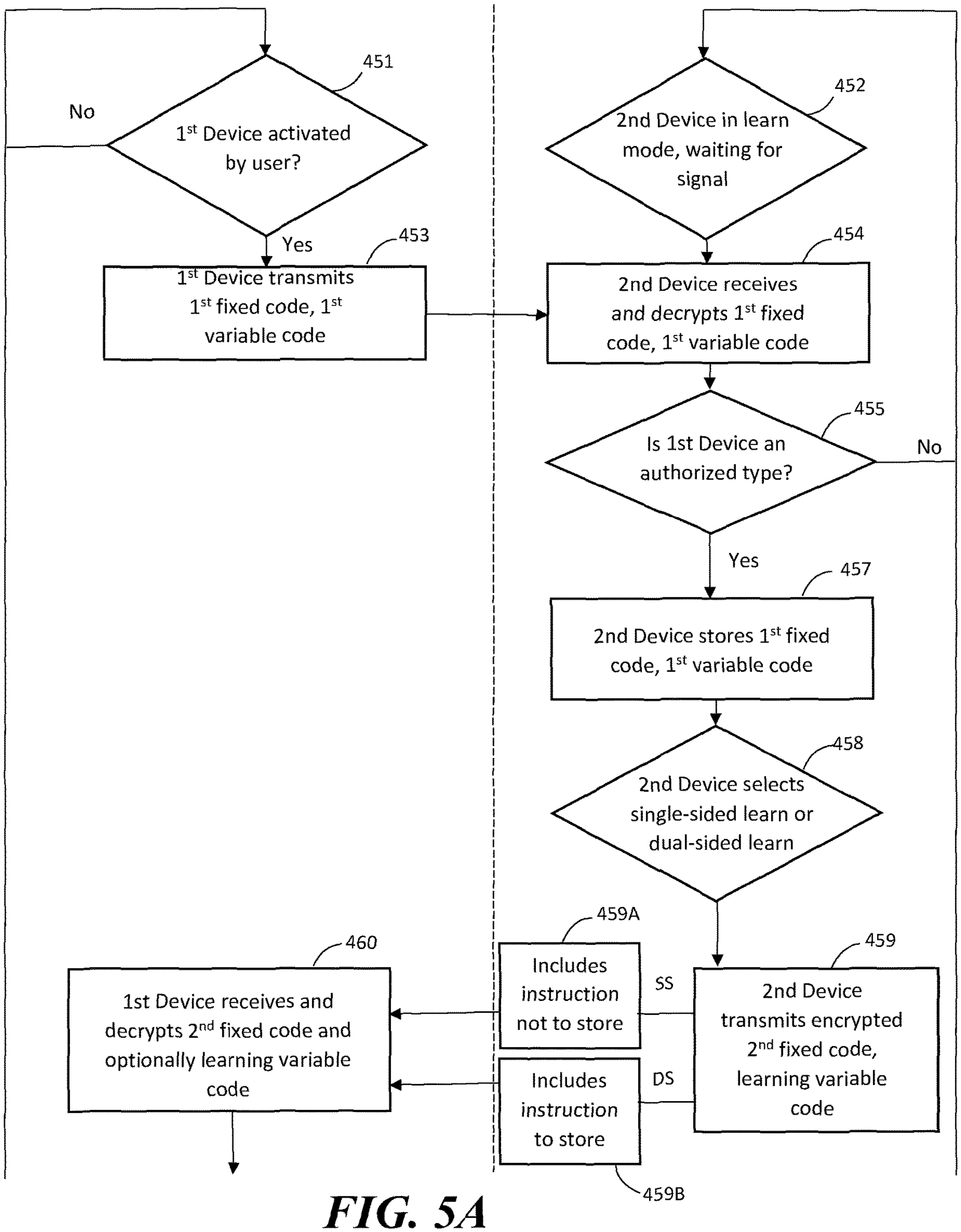
FIGS. 5A-C are interconnecting flow diagrams showing an example communication flow between a first device and a second device during a learning or pairing sequence.
Figure 5B:
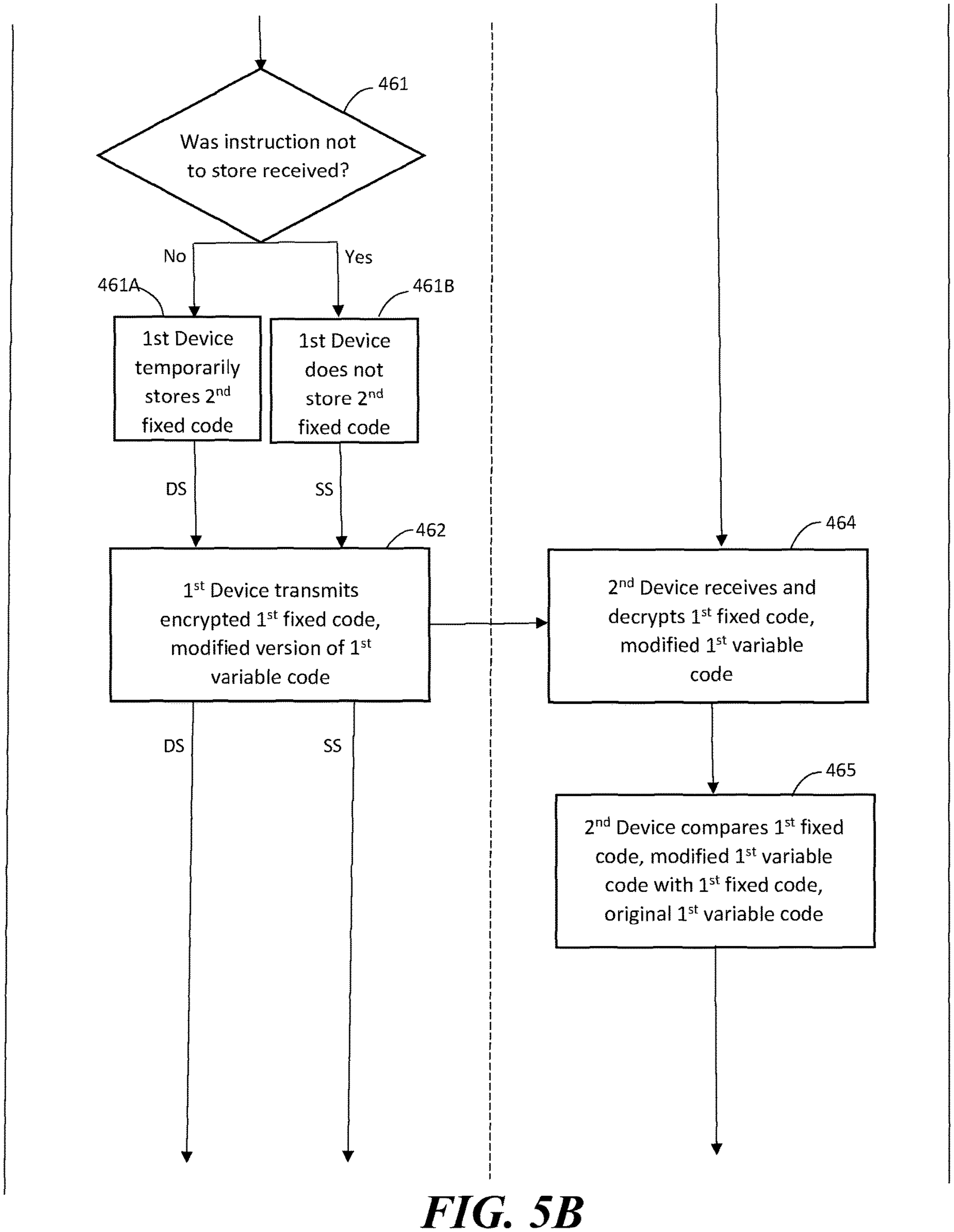
Figure 5C:
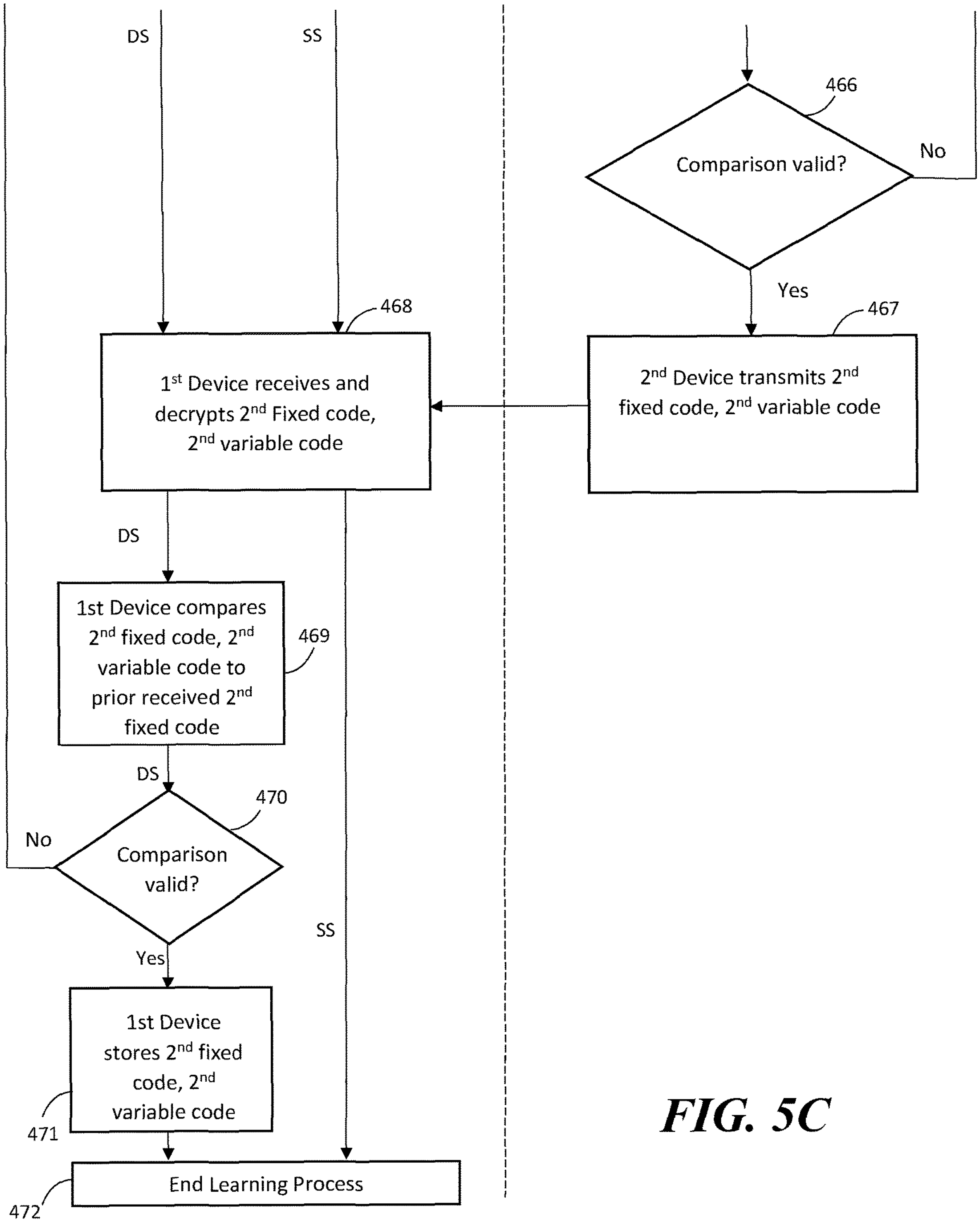

Turning now to FIGS. 5A-C, a flow diagram is provided that illustrates an example method of pairing a first device to a second device so that, for example, a first device is synchronized with a second device in order to recognize and validate signals so that the devices are paired. Steps to the left of the central dashed line relate to the first device, such as a user-operated control device, while steps to the right relate to the second device, such as a movable barrier operator or a receiver that is associated with or integrated into a moveable barrier operator. For example, the first and second devices may be the control device 30 and the operator 12 discussed previously in connection with FIGS. 2 and 3. The method involves at least one of the devices learning a changing code sequence from the other device, and in some embodiments, may involve bidirectional learning so that each device receives and stores a series of fixed and changing code values from the other device. In the illustrated embodiment, the second device determines whether to initiate bidirectional (dual-sided) learning wherein both devices learn an encrypted changing code from the other device or unidirectional (single-sided) learning of devices wherein only one device learns an encrypted changing code of the other device. In some embodiments, the devices may be configured so that the method of pairing entails receiving a user input such as a button or other actuator being manipulated on one or both devices, such as pressing a button or activating a physical switch on a garage door operator to set that device set to a learning mode.

In one form, the pairing method begins when a first device is activated by a user (step 451) while a second device has been placed in "learn" mode (step 452), such as by pushing a button or otherwise instructing the second device. To begin, the first device contains within its memory a first fixed code and a first variable code, and the second device contains a second fixed code and a second variable code. When the first device is activated, it transmits (step 453) from the first device a first encrypted message that includes at least a first fixed code and a first changing or variable code, and that may also include other information such as a payload associated with a DIP switch of the first device. The second device receives and decrypts the first encrypted message (step 454) while in the learning mode and determines (step 455) if the first device is of an authorized type (validates that the first device is appropriate to learn). The second device may determine if the first device is authorized by, for instance, comparing information received from the first device (such as the first fixed code) to an authorized device whitelist, analyzing the format or other characteristics of the first encrypted message, proximity of the first device to the second device when learning mode is activated, or any other known method, relying on database (410) information stored in or available to the second device, available through a local or cloud-based network, or utilizing other sources of information. If the first device is not recognized as authorized, the pairing process terminates. On the other hand, if the second device determines that the first device is of an authorized type, the second device temporarily stores in the second device's memory the decrypted first fixed and first variable codes from the first encrypted message (or portions thereof) and optionally other transmitted information (step 457). The second device also determines whether to proceed with a single-sided learning protocol (where the second device learns the first device) or a dual-sided learn (where the second device learns the first device and the first device also learns the second device). The second device selects either a single-sided learning protocol or dual-sided learning protocol based on one or more factors from the transmission received from the first device (step 458), for instance based on the first fixed code or a portion thereof. The second device then encrypts and transmits 459 a response to the first device, the response comprising a second encrypted message including a second fixed code from the second device. The second encrypted message also includes a learning variable code that signals to the first device that the second device is learning the first device, and may further include other optional information. If the single-sided learn path (SS) has been selected by the second device, the transmission includes an instruction not to store information associated with the second fixed code or other portions of the second encrypted message (459A). If the dual-sided learn path (DS) has been selected, the transmission from the second device includes an instruction to store information associated with the second fixed code or other portions of the second encrypted message (459B). In both the single-sided learn path (SS) and dual-sided learn path (DS) the first device receives and decrypts the second fixed code (step 460). Optionally, the first device may require, specify or request that the second encrypted message is received within a specified time window of the transmission of the first encrypted message in order to be validated and decrypted by the first device. In addition, or alternatively, the first device may be configured to validate the second encrypted message in one or more other ways.

The first device then determines whether an instruction not to store information from the second encrypted message has been received (step 461), and if so the first device does not store the second fixed code in its memory (step 461B). If the first device determines (step 461) that an instruction not to store information has not been received from the second device, the first device consequently proceeds to temporarily store the second fixed code (step 461A). In either case, the first device encrypts and transmits a third encrypted message (step 462) comprising the first fixed code and a modified version of the first variable code, and in some cases additional information. In some forms, the first device may be configured to inspect the learning variable code received from the second device in step 459 to determine if the second device is learning the first device, and in some forms will only transmit the third encrypted message in step 462 if the first device confirms that the second device is learning the first device. In some cases additional information is transmitted in step 462, such as, for instance, a payload associated with a DIP switch of the first device indicating a state, mode, or type of the first device.

When the second device receives and decrypts (step 464) the third encrypted message, the second device validates the message by comparing the first fixed code and the changed versions of the first variable code to stored code values related to the first encrypted message (step 465). The second device also stores the first fixed code, modified version of the first variable code, and optionally other information such as a payload from the third encrypted message, such storing (not shown, after step 265) thereby establishing the first device as a learned device. The second device will also generate an initial second variable code. If the second device determines that the comparison is valid (step 466), the second device then transmits (step 467) in response to validating the third encrypted message a fourth encrypted message including the second fixed code and a second variable code from the memory of the second device.

The first device receives and decrypts (step 468) the fourth encrypted message and, if in a dual-sided (DS) learn protocol, validates the fourth message by comparing (step 469) the second fixed code and the second changing code to information relating to the response stored by the first device. If the fourth message is determined to be valid (step 470), the first device stores the second fixed code and the second changed version of the second variable code (step 471) to establish the second device as a learned device in response to validating the fourth encrypted message prior to ending the learning process (step 472). Otherwise if the fourth message is determined (step 470) to be invalid, the learning process is terminated prior to storing the second fixed code and second variable code. In the single-sided (SS) learn protocol, the first device proceeds directly to the end of the learning process (step 472) without storing the second fixed code and second variable code (i.e. bypassing steps 469, 470 and 471).

The variable or changing codes transmitted by the first and second devices may be selected from those known in the art, such as rolling code systems in which the changing code is modified based on a preset algorithm and/or a predefined list or sequence of numbers. When a device validates a changing code by comparison with stored values, the device will ordinarily compare the received code value to a plurality of expected subsequent values in order to account for activations of one device that are out of range of the other device or otherwise do not result in communication with the other device. For instance, in some embodiments a device will compare a received changing code to at least twelve stored values, and in some embodiments at least 24, 48, 96, 128, or 256 stored values.

A variety of methods and/or algorithms may be used to encrypt and/or decrypt the fixed and changing codes of each message transmitted between devices. In some forms, a first device transmits an encrypted signal by generating a radio frequency oscillatory signal, generating variable binary code, generating a three-valued/trinary code responsive to the variable binary code, and modulating the radio frequency oscillatory signal with the trinary code to produce a modulated trinary coded variable radio frequency signal for operation or control of a second device. To provide even further security, in some embodiments the fixed code and the rolling codes may be shuffled or interleaved so that alternating trinary bits are comprised of a fixed code bit and a rolling code bit to yield, for example, a total of 40 trinary bits. The 40 trinary bits may then be packaged in a first 20-trinary bit frame and a second 20-trinary bit frame. A single synchronization and/or identification pulse may proceed the first and second frames to indicate the start of the frame and whether it is the first frame or the second frame. Signals may be configured to comply with local laws and regulations; for instance, immediately following each of the frames, the first device may be placed into a quieting condition to maintain the average power of the transmitter over a typical 100 millisecond interval and within local regulations (e.g. within legal limits promulgated by the United States Federal Communications Commission). The first trinary frame and the second trinary frame may be used to modulate a radio frequency carrier, for instance via amplitude modulation, to produce an amplitude modulated encrypted signal. The amplitude modulated encrypted signal may then be transmitted and may be received by the second device.

In some embodiments, the second device receives the amplitude modulated encrypted signal and demodulates the signal to produce a pair of trinary bit encoded frames. The trinary bits in each of the frames may be converted substantially in real-time to 2-bit or half nibbles indicative of the values of the trinary bits which ultimately may be used to form two 16-bit fixed code words and two 16-bit variable code words. The two 16-bit fixed code words may be used as a pointer to identify the location of a previously stored variable code value within the operator. The two 16-bit rolling code words may be concatenated by taking the 16-bit words having the more significant bits, multiplying it by 310 and then adding the result to the second of the words to produce a 32-bit encrypted variable code. The 32-bit encrypted code may then be compared via a binary subtraction with the stored variable code. If the 32-bit code is within a window or fixed count, the microprocessor of the second device may produce an authorization signal which may then be responded to by other portions of the second device's circuit to cause the garage door to open or close as commanded. In the event that the code is greater than the stored rolling code, plus the fixed count, indicative of a relatively large number of incrementations, a user may be allowed to provide further signals or indicia to the receiver to establish authorization, instead of being locked out, without any significant degradation of the security. This process may be accomplished by the receiver entering an alternate mode using two or more successive valid codes to be received, rather than just one. If the two or more successive valid codes are received in this example, the operator will be actuated and the garage door will open. However, in such an embodiment, to prevent a person who has previously or recently recorded a recent valid code from being able to obtain access to the garage, a trailing window is compared to the received code. If the received code is within this trailing window, the response of the system simply is to take no further action, nor to provide authorization during that code cycle due to indications that the code has been purloined.

Figure 6:
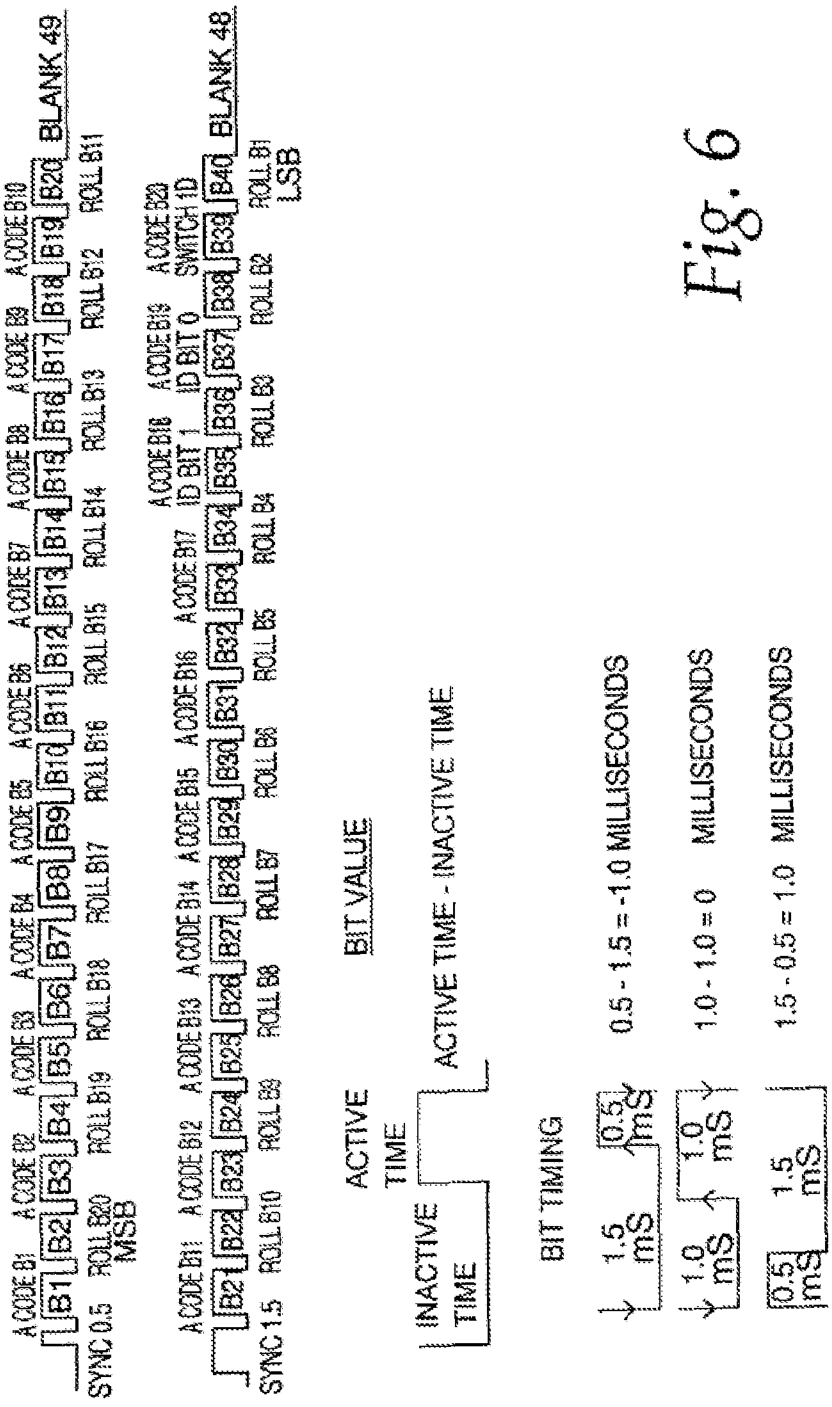
FIG. 6 is a timing diagram of examples of signals generated by a portion of a transmitter of one of the first and second devices.

FIGS. 6-8H demonstrate one potential encryption/decryption scheme. FIG. 6 is an example of trinary code which is used to modify the radio frequency oscillator signal. In the depicted example, the bit timing for a 0 is 1.5 milliseconds down time and 0.5 millisecond up time, for a 1, 1 millisecond down and 1 millisecond up, and for a 2, 0.5 millisecond down and 1.5 millisecond up. The up time is actually the active time when carrier is being generated. The down time is inactive when the carrier is cut off. The codes are assembled in two frames, each of 20 trinary bits, with the first frame being identified by a 0.5 millisecond sync bit and the second frame being identified by a 1.5 millisecond sync bit.

Figure 7A:
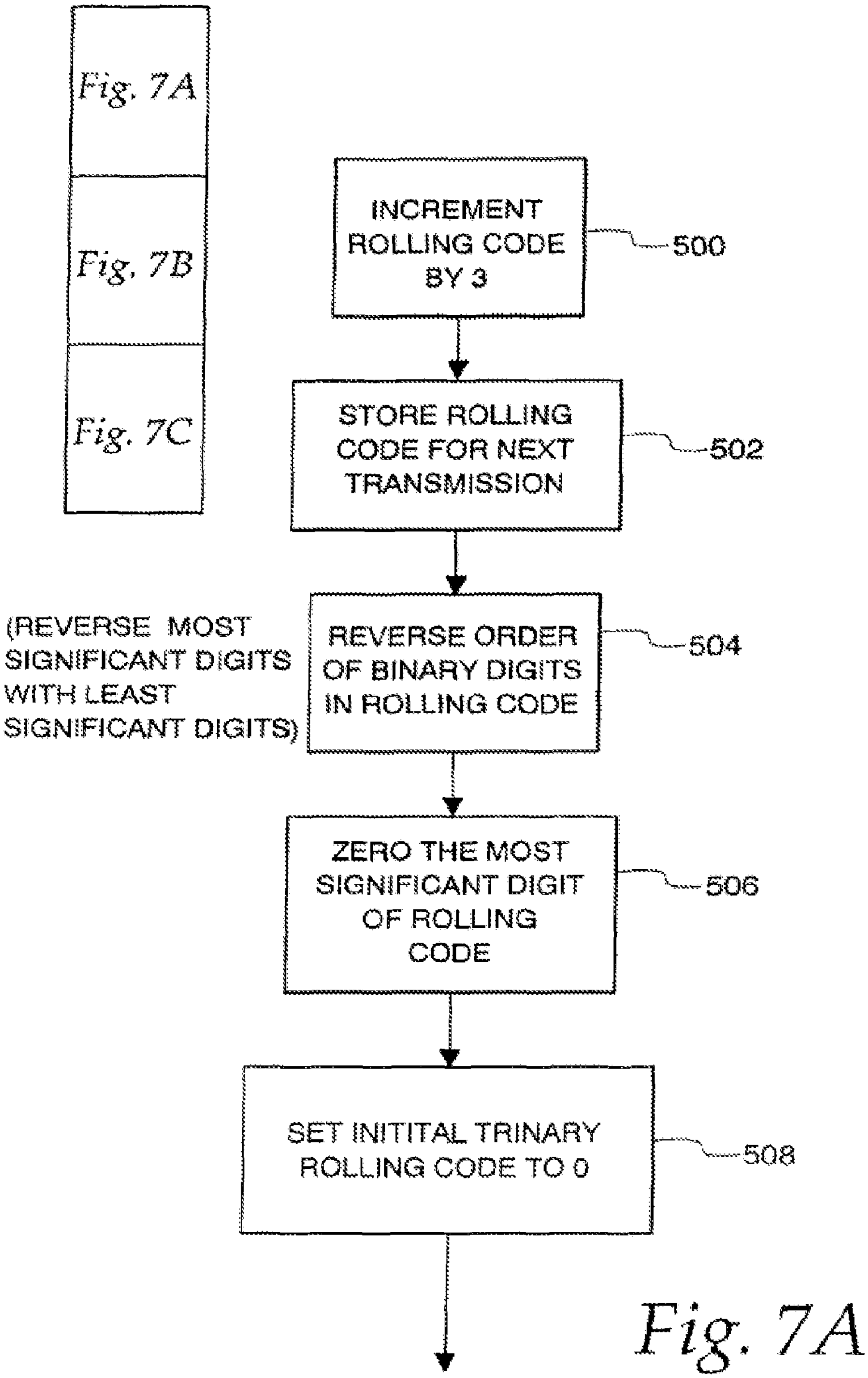
FIGS. 7A-C are flow diagrams showing examples of operation of the transmitter.
Figure 7B:
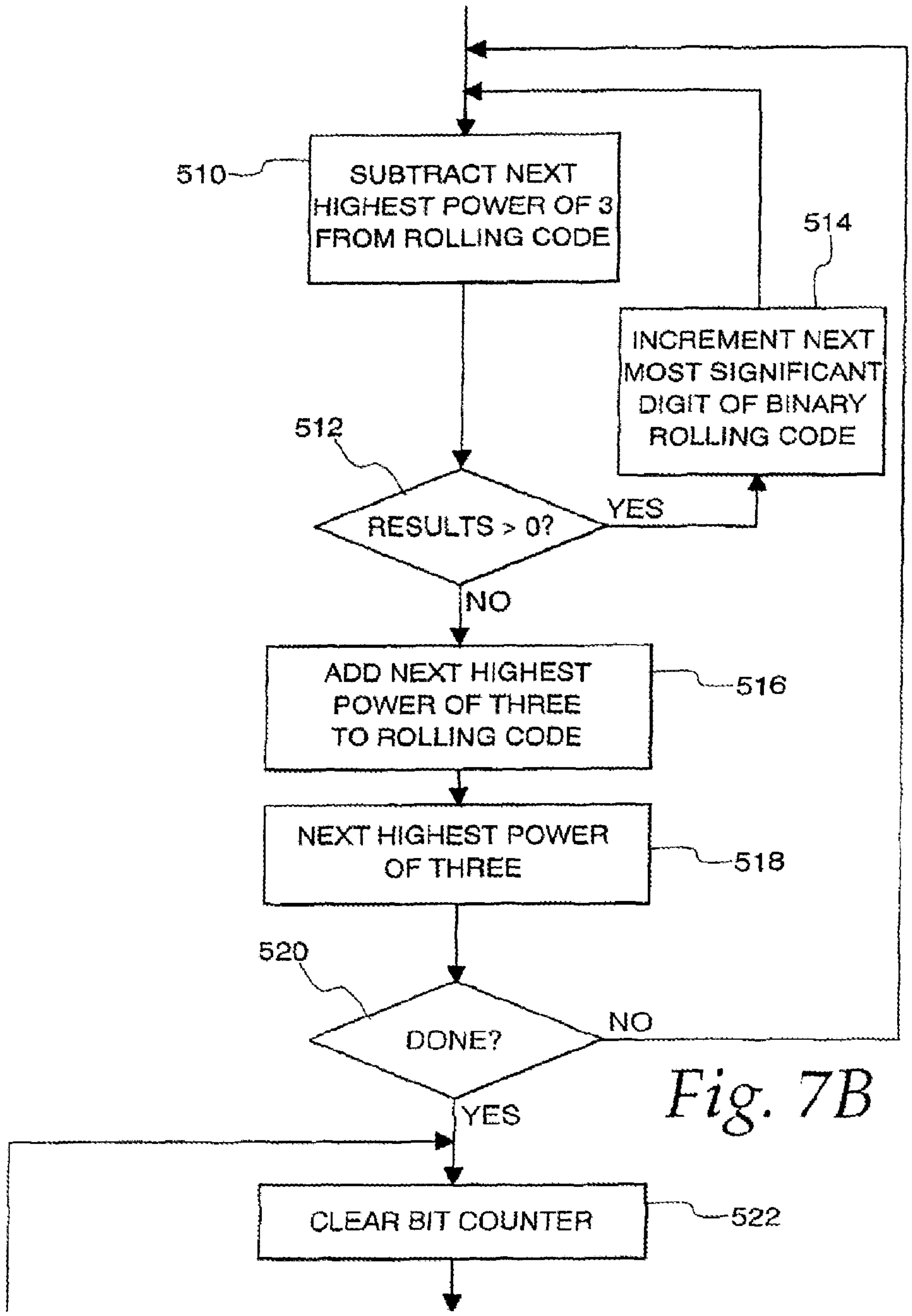
Figure 7C:
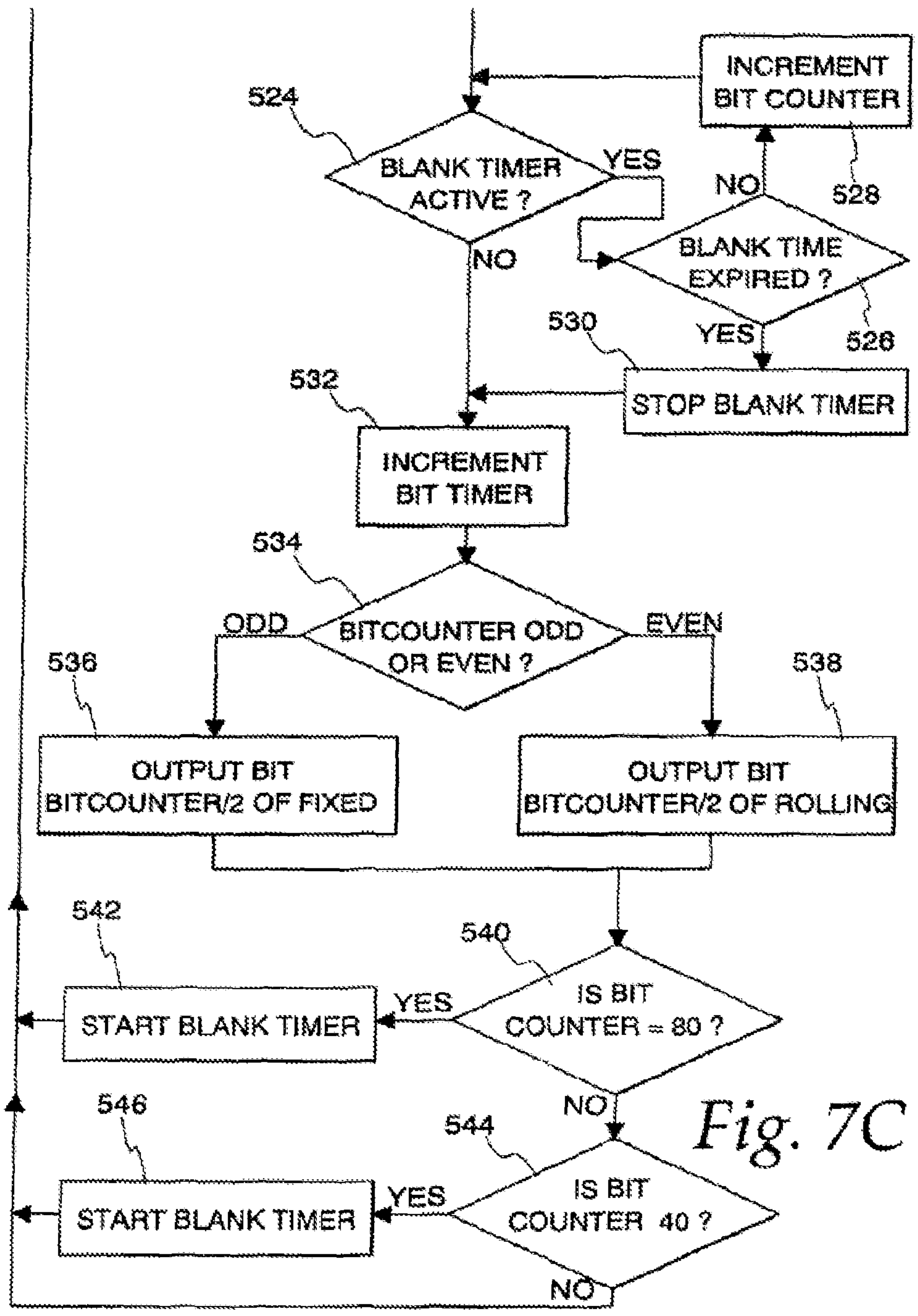

Referring now to FIGS. 7A through 7C, the flow chart set forth therein describes one form of generating a rolling code encrypted message from a first device to be transmitted to a second device. A rolling code is incremented by three in a step 500, followed by the rolling code being stored 502 for the next transmission from the device when a button is pushed. The order of the binary digits in the rolling code is inverted or mirrored in a step 504, following which in a step 506, the most significant digit is converted to zero effectively truncating the binary rolling code. The rolling code is then changed to a trinary code having values 0, 1 and 2 and the initial trinary rolling code bit is set to 0 in step 508. In some forms, the trinary code is actually used to modify the radio frequency oscillator signal, and an example of trinary code is shown in FIG. 6. It may be noted that the bit timing in FIG. 6 for a 0 is 1.5 milliseconds down time and 0.5 millisecond up time for a 1, 1 millisecond down and 1 millisecond up, and for a 2, 0.5 millisecond down and 1.5 milliseconds up. The up time is actually the active time when carrier is being generated or transmitted. The down time is inactive when the carrier is cut off. The codes are assembled in two frames, each of 20 trinary bits, with the first frame being identified by a 0.5 millisecond sync bit and the second frame being identified by a 1.5 millisecond sync bit.

In a step 510, the next highest power of 3 is subtracted from the rolling code and a test is made in a step 512 to determine if the result is greater than zero. If it is, the next most significant digit of the binary rolling code is incremented in a step 514, following which the method returns to the step 510. If the result is not greater than 0, the next highest power of 3 is added to the rolling code in step 516. In step 518, another highest power of 3 is incremented and in a step 518, another highest power of 3 is incremented and in a step 520, a test is determined as to whether the rolling code is completed. If not, control is transferred back to step 510. If the rolling code is complete, step 522 clears the bit counter. In a step 524, a blank timer is tested to determine whether it is active or not. If not, the bit counter is incremented in step 532. However, if the blank timer is active, a test is made in step 526 to determine whether the blank timer has expired. If the blank timer has not expired, control is transferred to a step 528 in which the bit counter is incremented, following which control is transferred back to the decision step 524. If the blank timer has expired as measured in decision step 526, the blank timer is stopped in a step 530 and the bit counter is incremented in a step 532. The bit counter is then tested for odd or even in a step 534. If the bit counter is not even, control is transferred to a step 536 where the output bit of the bit counter divided by 2 is fixed. If the bit counter is even, the output bit counter divided by 2 is rolling in a step 538. The bit counter is tested to determine whether it is set to equal to 80 in a step 540—if yes, the blank timer is started in a step 542, but if not, the bit counter is tested for whether it is equal to 40 in a step 544. If it is, the blank timer is tested and is started in a step 546. If the bit counter is not equal to 40, control is transferred back to step 522.

Figure 8A:
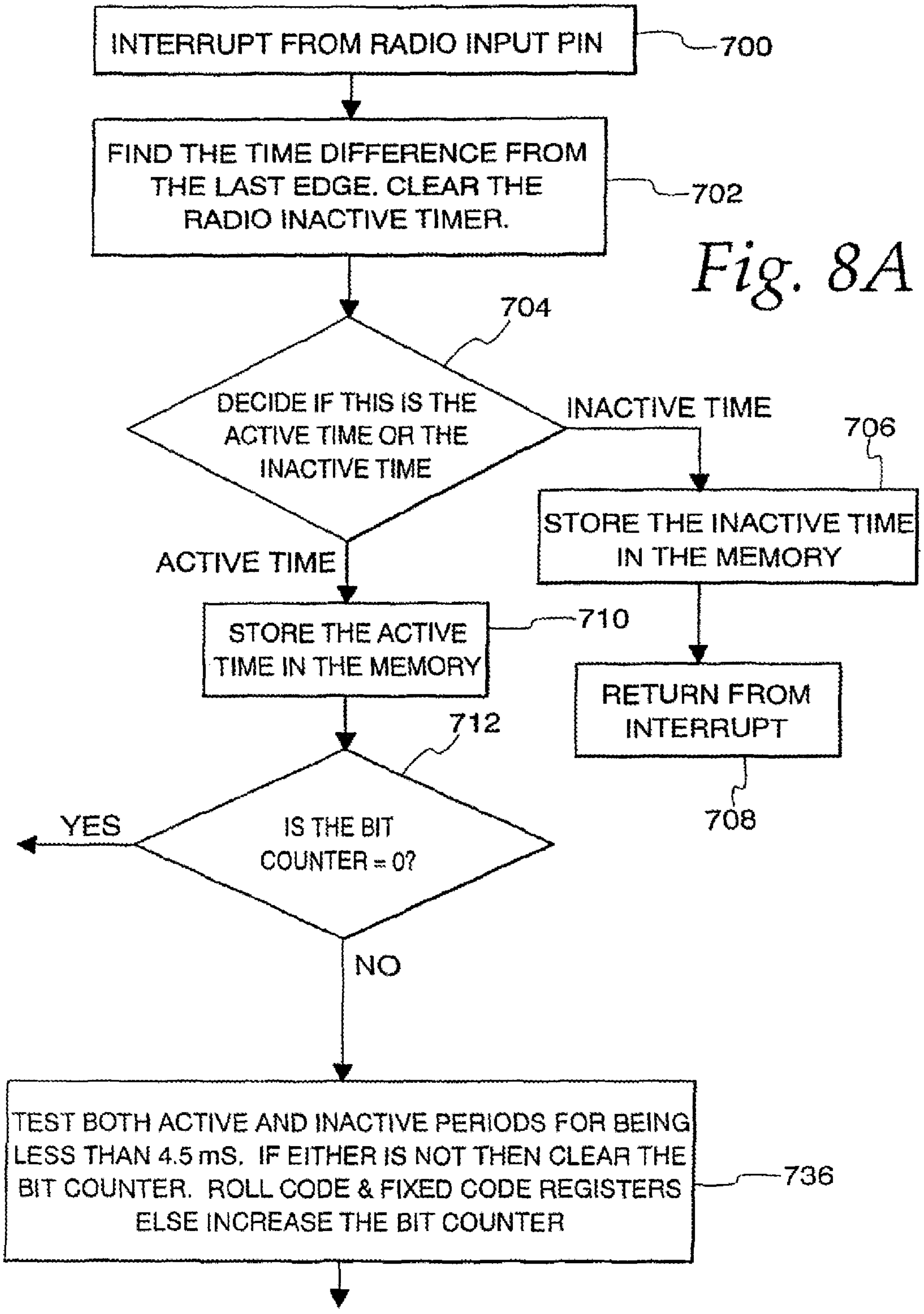
Figure 8C:
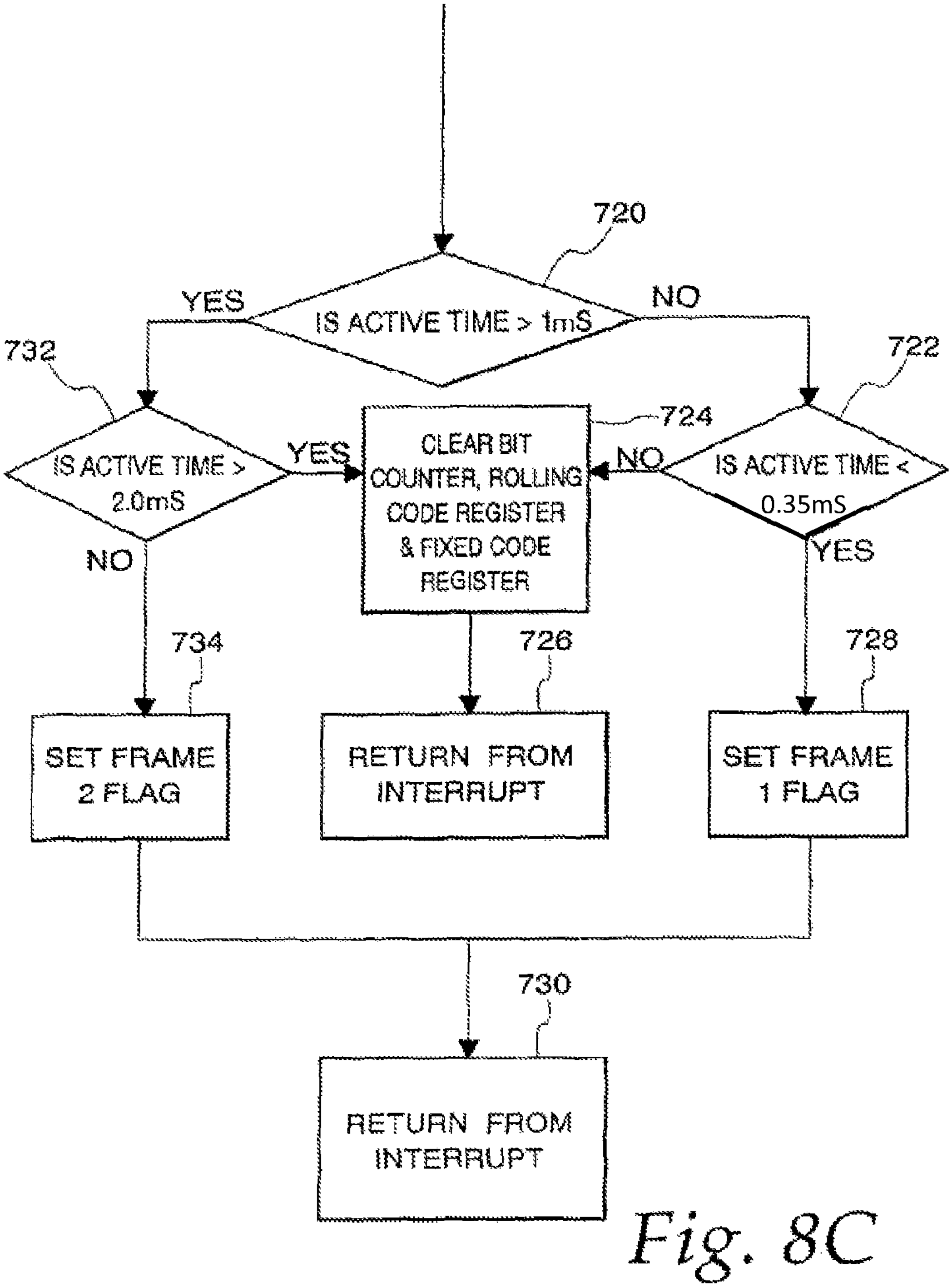

Referring now to FIGS. 8A through 8F and, in particular, to FIG. 8A, one example of processing of an encrypted message by a second device from a first device is set forth therein. In a step 700, an interrupt is detected and acted upon. The time difference between the last edge is determined and the radio inactive timer is cleared in step 702. A determination is made as to whether this is an active time or inactive time in a step 704, i.e., whether the signal is being sent with carrier or not. If it is an inactive time, indicating the absence of carrier, control is transferred to a step 706 to store the inactive time in the memory and the routine is exited in a step 708. In the event that it is an active time, the active time is stored in memory in a step 710 and the bit counter is tested in a step 712. If the bit counter is zero, control is transferred to a step 714, as may best be seen in FIG. 8B and a test is made to determine whether the inactive time is between 20 milliseconds and 55 milliseconds. If it is not, the bit counter is cleared as well as the rolling code register and the fixed code register in step 716 and the routine is exited in step 718.

In the event that the inactive time is between 20 milliseconds and 55 milliseconds, a test is made in a step 720 to determine whether the active time is greater than 1 millisecond, as shown in FIC. 8C. If it is not, a test is made in a step 722 to determine whether the inactive time is less than 0.35 millisecond. If it is, a frame 1 flag is set in a step 728 identifying the incoming information as being associated with frame 1 and the interrupt routine is exited in a step 730. In the event that the active time test in step 722 is not less than 0.35 millisecond, in the step 724, the bit counter is cleared as well as the rolling code register and the fixed register, and the return is exited in the step 726. If the active time is greater than 1 millisecond as tested in step 720, a test is made in a step 732 to determine whether the active time is greater than 2.0 milliseconds, and if not the frame 2 flag is set in a step 734 and the routine is exited in step 730. If the active time is greater than 2 milliseconds, the bit counter rolling code register and fixed code register are cleared in step 724 and the routine is exited in step 726.

Figure 8D:
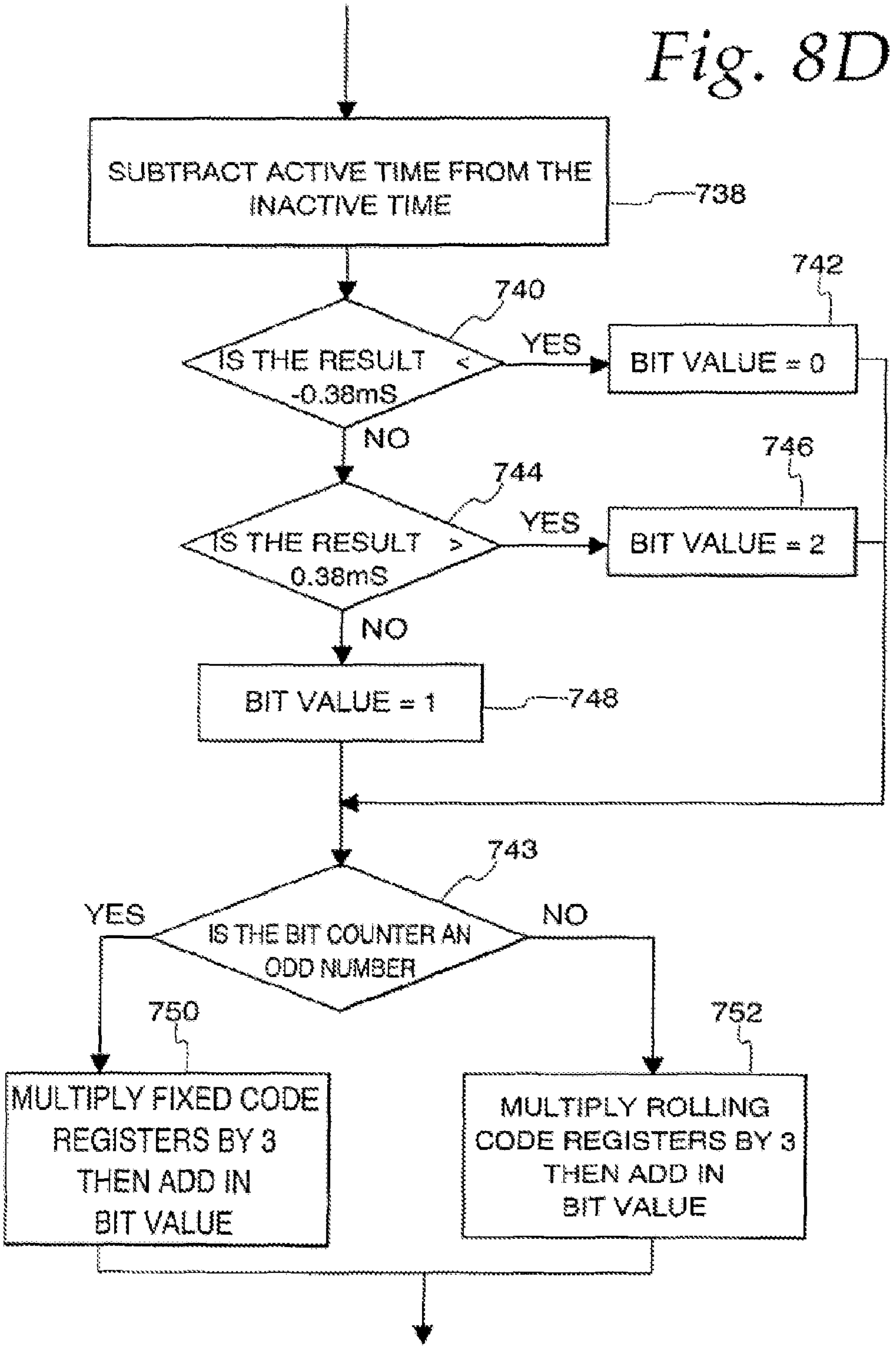

In the event that the bit counter test in step 712 indicates that the bit counter is not 0, control is transferred to setup 736, as shown in FIG. 8A. Both the active and inactive periods are tested to determine whether they are less than 4.5 milliseconds. If either period is not less than 4.5 milliseconds, the bit counter is cleared as well as the rolling code register and the fixed code registers. If both are equal to or greater than 4.5 milliseconds, the bit counter is incremented and the active time is subtracted from the inactive time in the step 738, as shown in FIG. 8D. In the step 740, the results of the subtraction are determined as to whether they are less than 0.38 milliseconds. If they are the bit value is set equal to zero in step 742 and control is transferred to a decision step 743. If the results are not less than 0.38 milliseconds, a test is made in a step 744 to determine if the difference between the active time and inactive time is greater than 0.38 milliseconds and control is then transferred to a step 746 setting the bit value equal to 2. Both of the bit values being set in steps 742 and 746 relate to a translation from the three-level trinary bits 0, 1 and 2 to a binary number.

If the result of the step 744 is in the negative, the bit value is set equal to 1 in step 748. Control is then transferred to the step 743 to test whether the bit counter is set to an odd or an even number. If it is set to an odd number, control is transferred to a step 750 where the fixed code, indicative of the fact that the bit is an odd numbered bit in the frame sequence, rather an even number bit, which would imply that it is one of the interleaved rolling code bits, is multiplied by three and then the bit value added in.

Figure 8E:
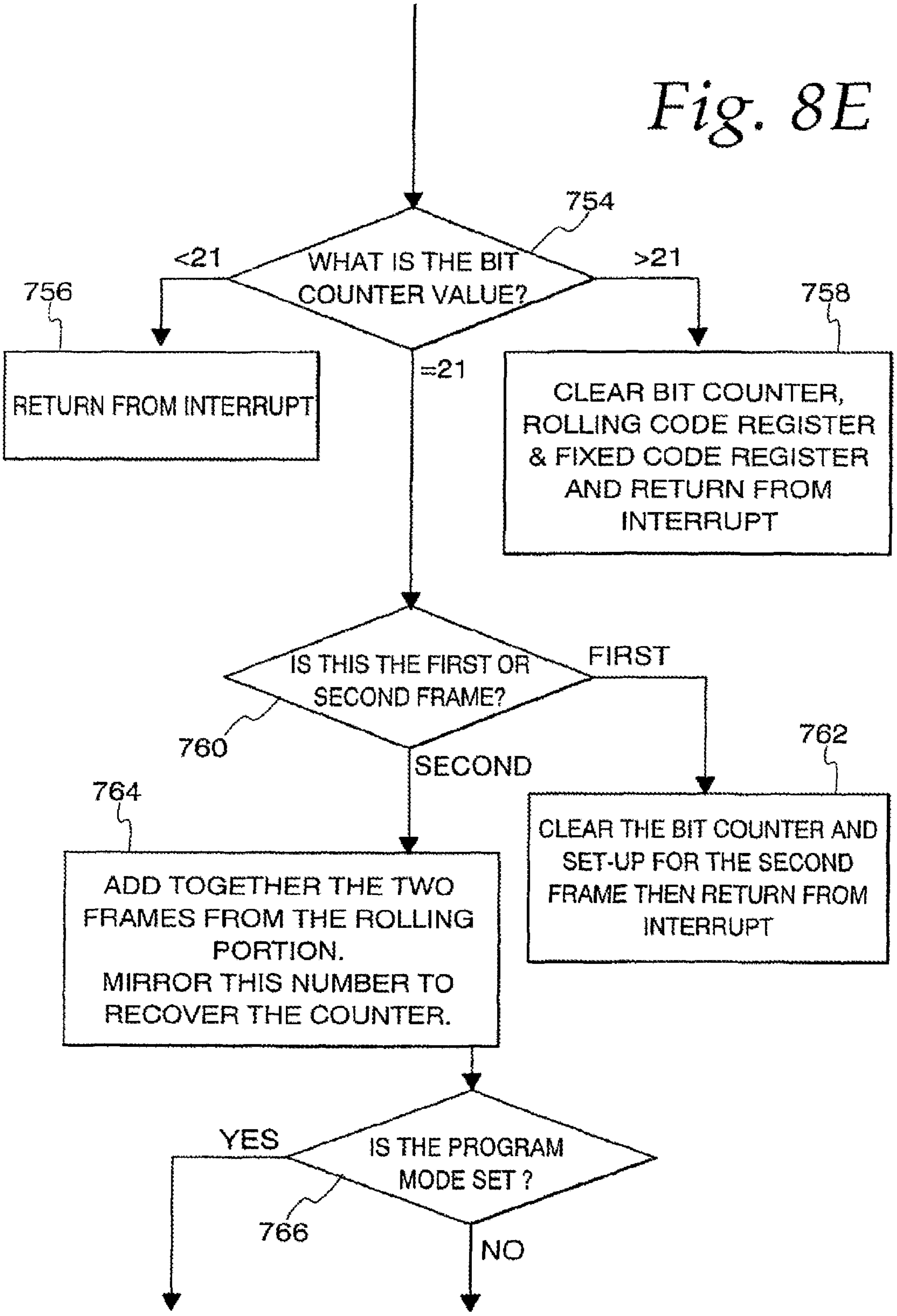
Figure 8F:
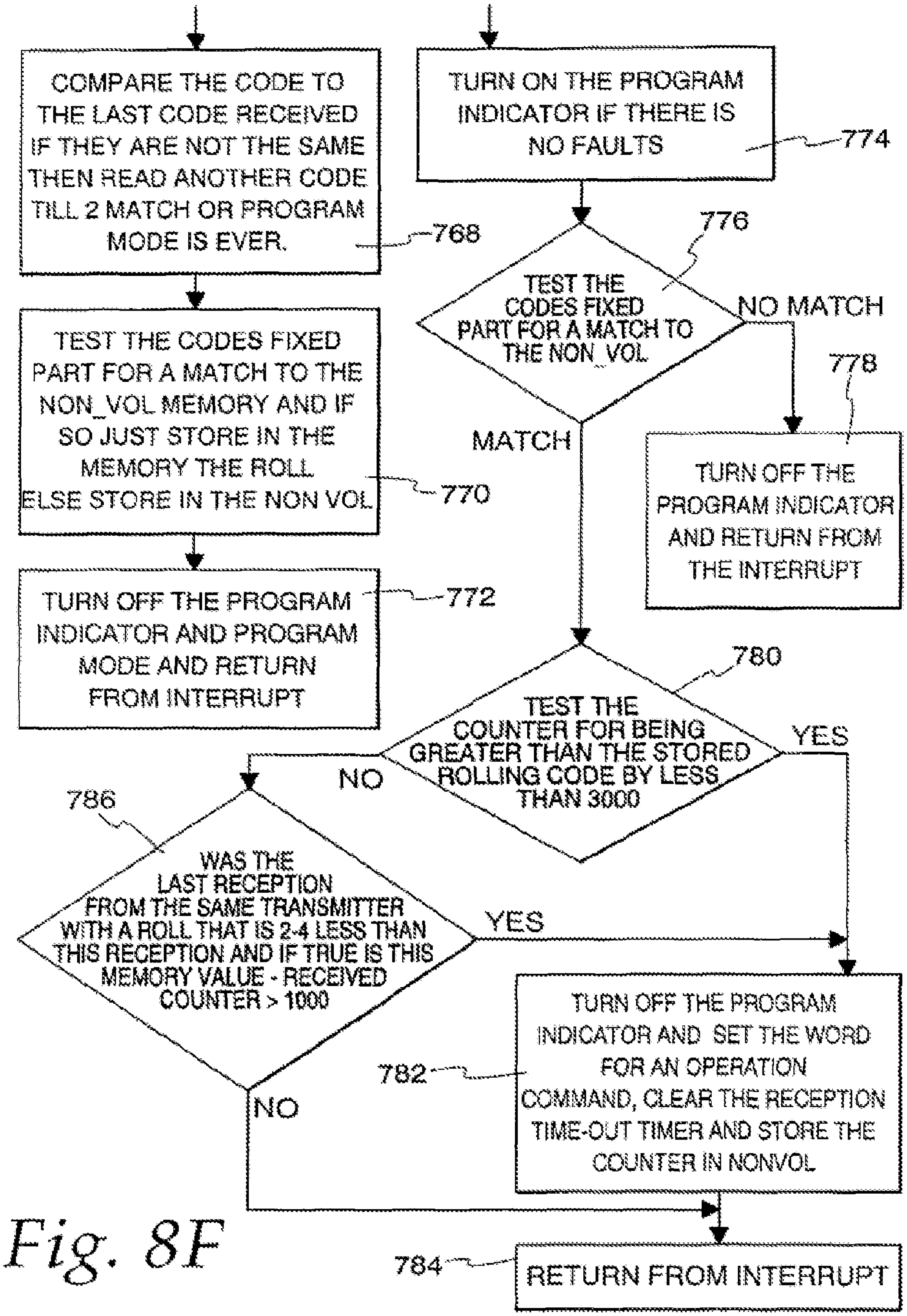

If the bit counter indicates that an odd number trinary bit is being processed, the existing rolling code registers are multiplied by three and then the trinary bit value obtained from steps 742, 746 and 748 is added in. Whether step 750 or 752 occurs, the bit counter value is then tested in the step 754, as shown in FIG. 8E. If the bit counter value is greater than 21, the bit counter rolling code register and fixed code register are cleared in the step 758 and the routine is exited. If the bit counter value is less than 21, there is a return from the interrupt sequence in a step 756. If the bit counter value is equal to 21, indicating that a sink bit plus trinary data bits have been received, a test is made in a step 760 to determine whether the sink bit was indicative of a first or second frame, if it was indicative of a first frame, the bit counter is cleared and set up is done for the second frame following which there is a return from the routine in the step 762. In the event that the second frame is indicated as being received by the decision of step 760, the two frames have their rolling contributions added together to form the complete inverted rolling code. The rolling code is then inverted or mirrored to recover the rolling code counter value in the step 764. A test is made in the step 766 to determine whether the program mode has been set. If it has been set, control is transferred to a step 768 where the code is compared to the last code received. If there is no match, then another code will be read until two successive codes match or the program mode is terminated. In a step 770, the codes are tested such that the fixed codes are tested for a match with a fixed code non-volatile memory. If there is a match, the rolling portion is stored in the memory. If there is not, the rolling portion is stored in the non-volatile memory. Control is then transferred to step 772, the program indicator is switched off, the program mode is exited and there is a return from the interrupt. In the event that the test of step 766 indicates that the program mode has not been set, the program indicator is switched on in a step 774, as shown in FIG. 8F. The codes are tested to determine whether there is a match for the fixed portion of the code in the step 776. If there is no match, the program indicator is switched off and the routine is exited in step 778. If there is a match, the counter which is indicative of the rolling code is tested to determine whether its value is greater than the stored rolling code by a factor or difference of less than 3,000 indicating an interval of 1,000 button pushes for the first device. If it is not, a test is made in the step 786 to determine whether the last transmission from the same first device is with a rolling code that is two to four less than the reception and, if true, is the memory value minus the received rolling code counter value greater than 1,000. If it is, control is transferred to a step 782 switching off the program indicator and setting the operation command word causing a commanded signal to operate the garage door operator. The reception time out timer is cleared and the counter value for the rolling code is stored in non-volatile memory, following which the routine is exited in the step 784. In the event that the difference is not greater than 1,000, in step 786 there is an immediate return from the interrupt in the step 784. In the event that the counter test in the step 780 is positive, steps 782 and 784 are then executed thereafter.

Figure 8G:
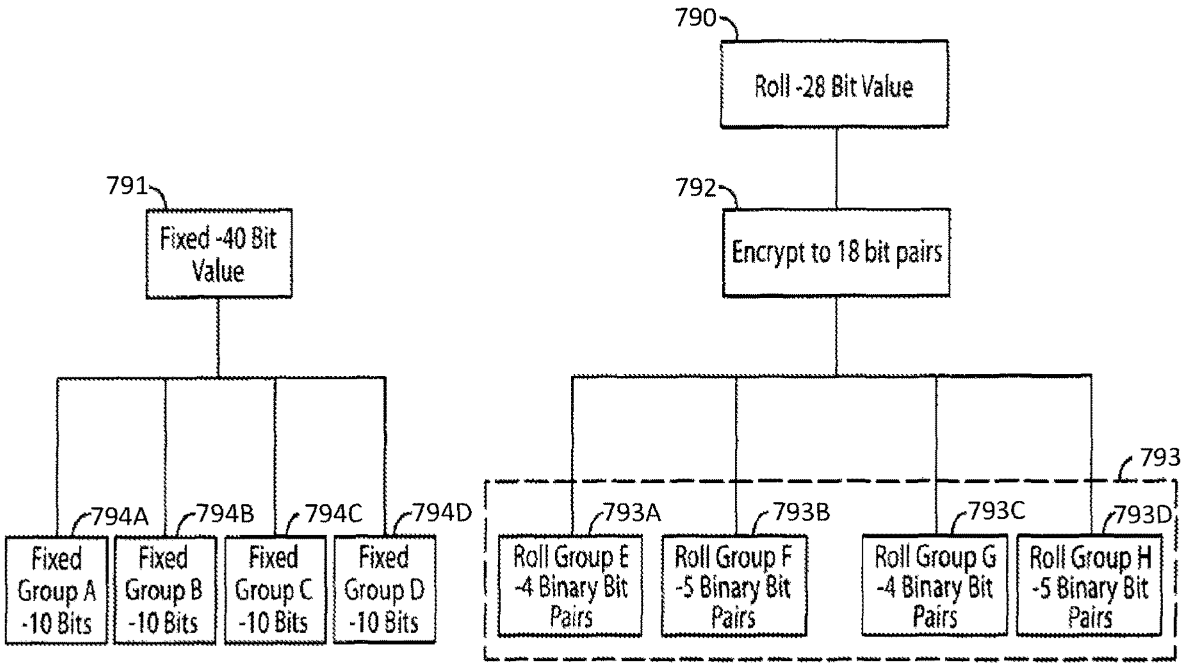
FIG. 8G is a schematic view of one example of bit processing for use in encrypting a message.
Figure 8H:
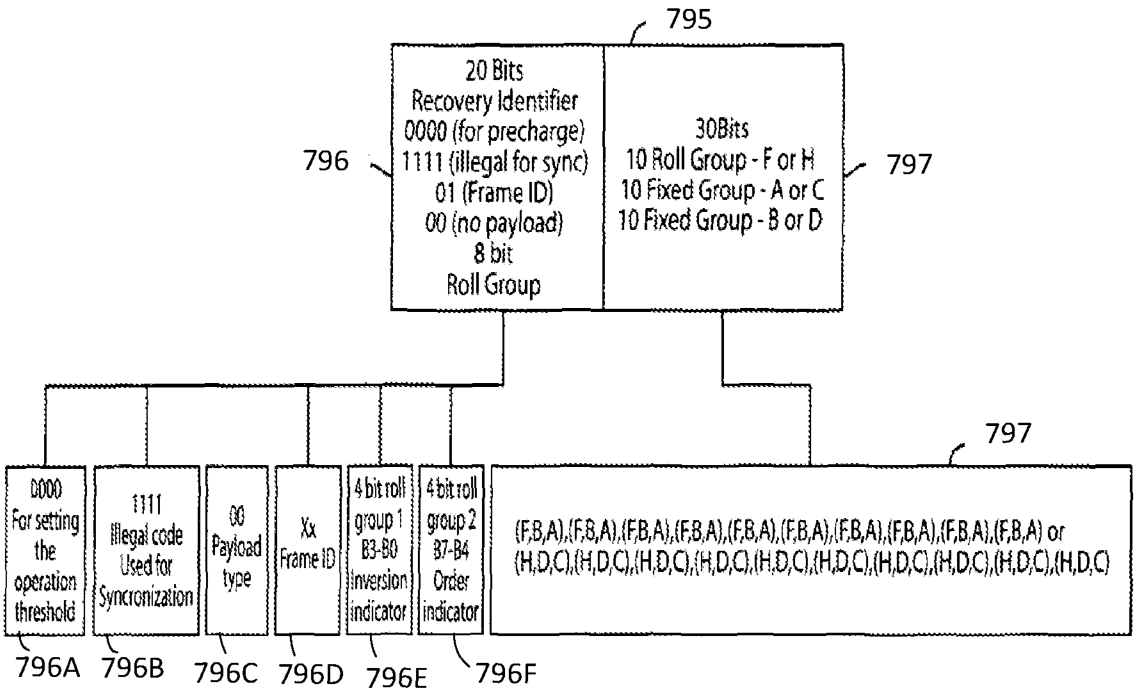
FIG. 8H is an example message diagram in accordance with one example of an encrypted message.

FIGS. 8G and 8H are schematic views of bit processing and parsing (FIG. 8G) and an example message diagram (FIG. 8H) configured in accordance with one example of forming an encrypted message. This provides one example in which a fixed code portion and variable (e.g. rolling) code portion may be used to form an encrypted message. Referring now to FIG. 8G, one illustrative embodiment of bit processing and parsing will be presented. In this example, the substantive content to be associated and transmitted with a 28 bit rolling code 790 comprises a 40 bit value that represents fixed information 791. This fixed information 791 may serve, for example, to uniquely identify the transmitter that will ultimately transmit this information. In this embodiment, the bits comprising the rolling code 790 are encrypted 792 by mirroring the bits and then translating those mirrored bits into ternary values as suggested above to provide corresponding bit pairs (in this example, this would comprise 18 such bit pairs) to thereby provide a resultant encrypted rolling code 793. This mirroring can be applied to specific groupings of bits in the rolling code creating mirrored groups or can involve the entire value. In this illustrative example, the encrypted rolling code 793 is presented for further processing as four groups. In this example, these four groups comprise a roll group E 793A comprised of four binary bit pairs, a roll group F 793B comprised of five binary bit pairs, a roll group G 793C comprised of four binary bit pairs, and a roll group H 793D comprised of five binary bit pairs.

The 40 bit fixed information 791 is subdivided in a similar manner albeit, in this embodiment, without encryption. This comprises, in this particular illustrative approach, forming four subgroups comprising a fixed group A 794A, a fixed group B 794B, a fixed group C 794C, and a fixed group D 794D, wherein each such group is comprised of 10 bits of the original 40 bit value.

These variously partitioned data groups can then be used as shown in FIG. 8H to effect a desired transmission. In this example, one or more joint messages 795 provide a primary vehicle by which to communicate the desired information (which includes both the encrypted rolling code and fixed information data as modified as a function of a given portion of the encrypted rolling code along with a recovery identifier that represents that given portion of the encrypted rolling code). This joint message 795 comprises, generally speaking, a first 20 bit portion 796 and a second 30 bit portion 797.

The first portion 796 comprises, in this embodiment, the following fields: "0000"—these bits 796A serve to pre-charge the decoding process and effectively establish an operational threshold; "1111"—these bits 796B comprise two bit pairs that present the illegal state "11" ("illegal" because this corresponds to a fourth unassigned state in the ternary context of these communications) and serve here as a basis for facilitating synchronization with a receiving platform: "00"—this bit pair 796C identifies a type of payload being borne by the joint message (in this embodiment, "00" corresponds to no payload other than the fixed identifying information for the transmitter itself, "01" corresponds to a supplemental data payload, and "10" corresponds to a supplemental data-only payload); "Xx"—this bit pair 796D presents a frame identifier that can be used by a receiver to determine whether all required joint messages 795 have been received and which can also be used to facilitate proper reconstruction of the transmitted data; "B3, B2, B1, B0"—these two bit pairs 796E comprise an inversion pattern recovery identifier and are selected from the bits that comprise the encrypted rolling code 793 described above; "B7, B6, B5, B4"—these two bit pairs 796F comprise a bit order pattern recovery identifier and are also selected from the bits that comprise the encrypted rolling code 793 described above.

There are various ways by which these recover identifier values can be selected. By one approach, a specified number of bits from the encrypted roll group can be selected to form a corresponding roll sub-group. These might comprise, for example, the first or the last eight bits of the encrypted roll group (in a forward or reversed order). These might also comprise, for example, any eight consecutive bits beginning with any pre-selected bit position. Other possibilities also exist. For example, only even position bits or odd position bits could serve in this regard. It would also be possible, for example, to use preselected bits as comprise one or more of the previously described roll group sub-groups.

It would also be possible to vary the selection mechanism from, for example, joint message to joint message. By one simple approach in this regard, for example, the first eight bits of the encrypted roll group 793 could be used to form the roll sub-group with the last eight bits of the encrypted roll group 793 being used in a similar fashion in an alternating manner. The bits that comprise this roll sub-group may then be further parsed to form two recovery indicators. These recovery indicators may be used in conjunction with one or more lookup tables to determine a data bit order pattern to use with respect to formatting the data as comprises a portion of the joint message. In some embodiments, roll groups used to form the recovery indicators do not appear in the joint message.

Figure 9A:
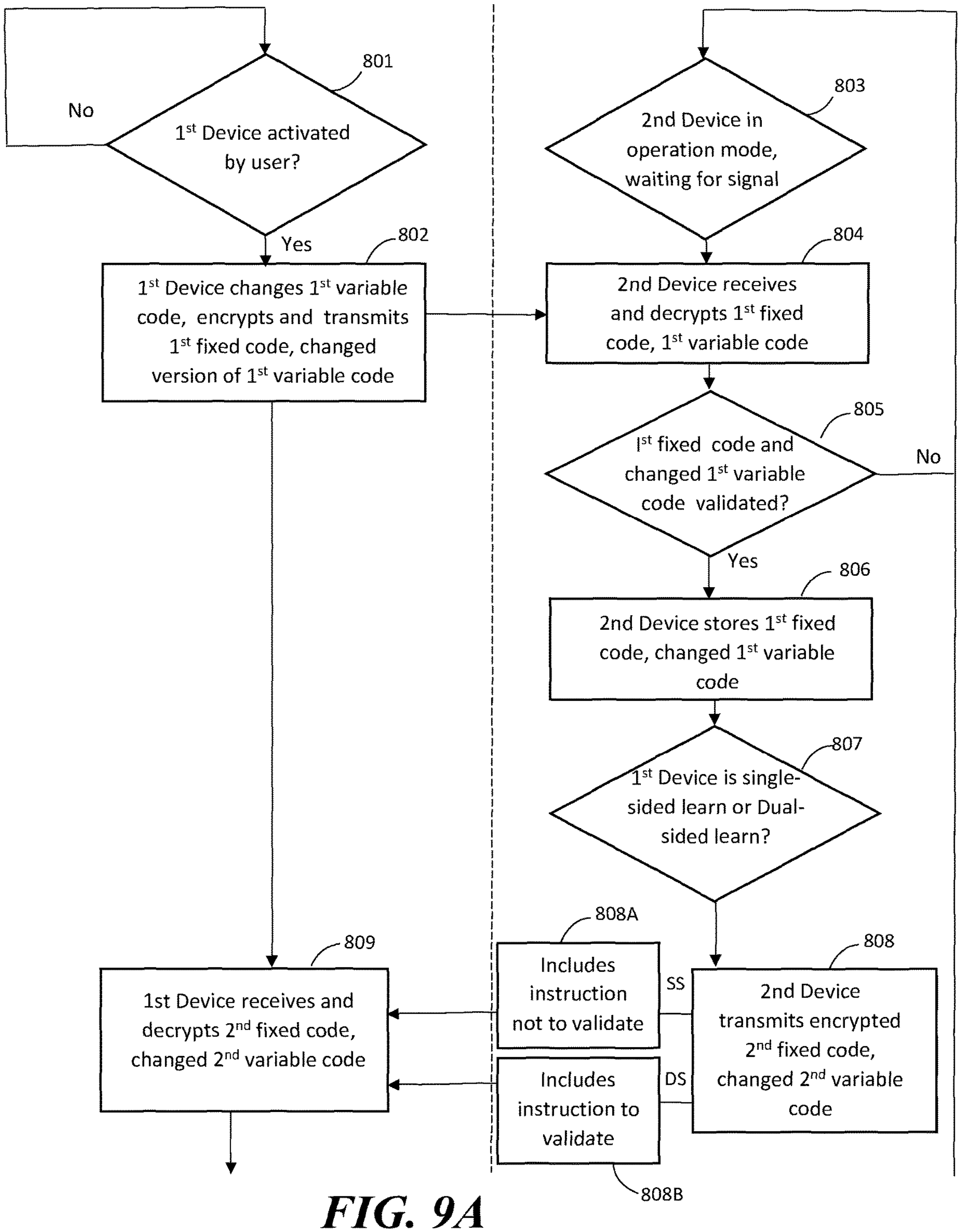
FIGS. 9A-C are interconnecting flow diagrams showing an example communication flow between a first device and a second device during normal operation.
Figure 9B:
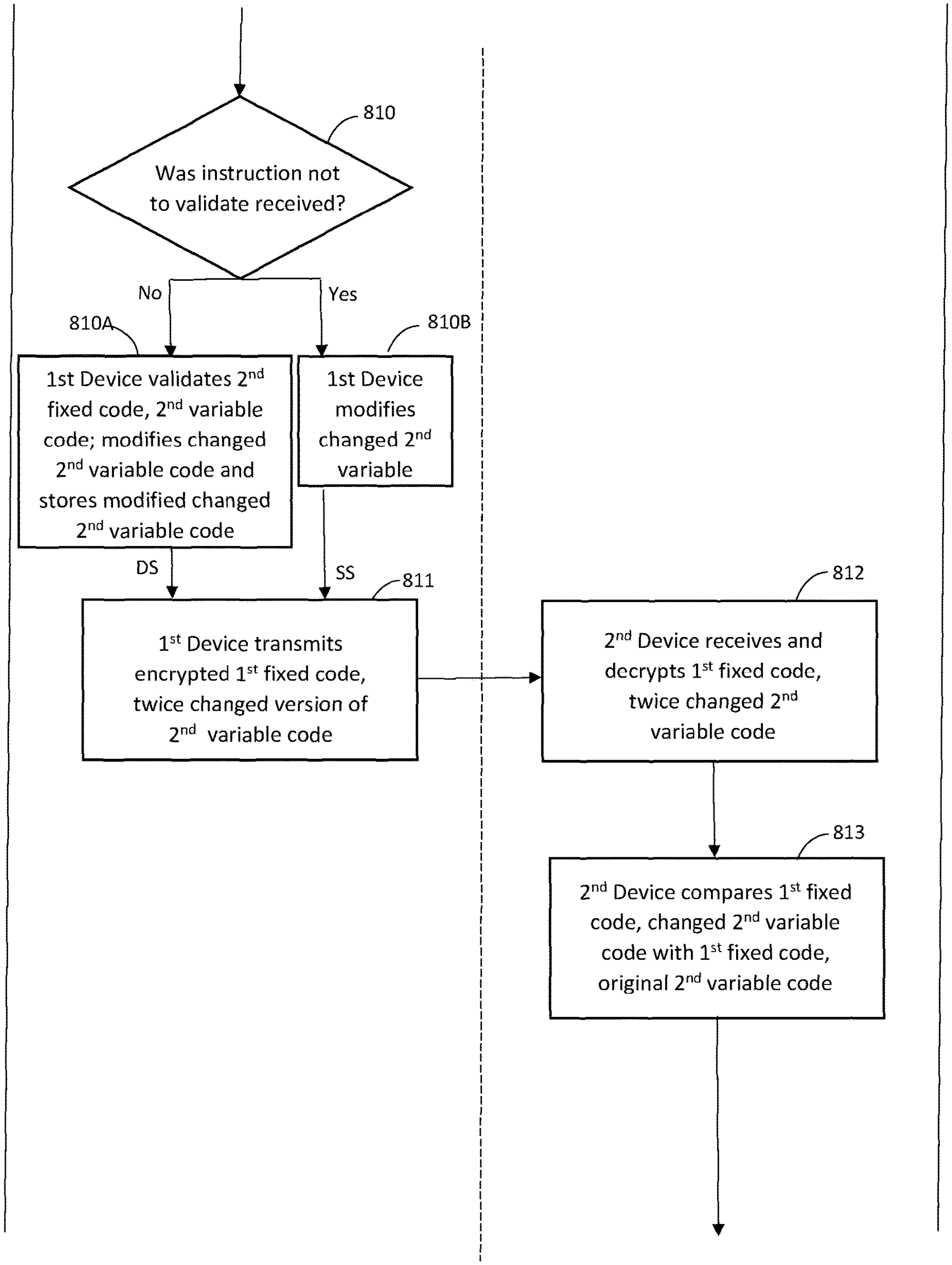
Figure 9C:
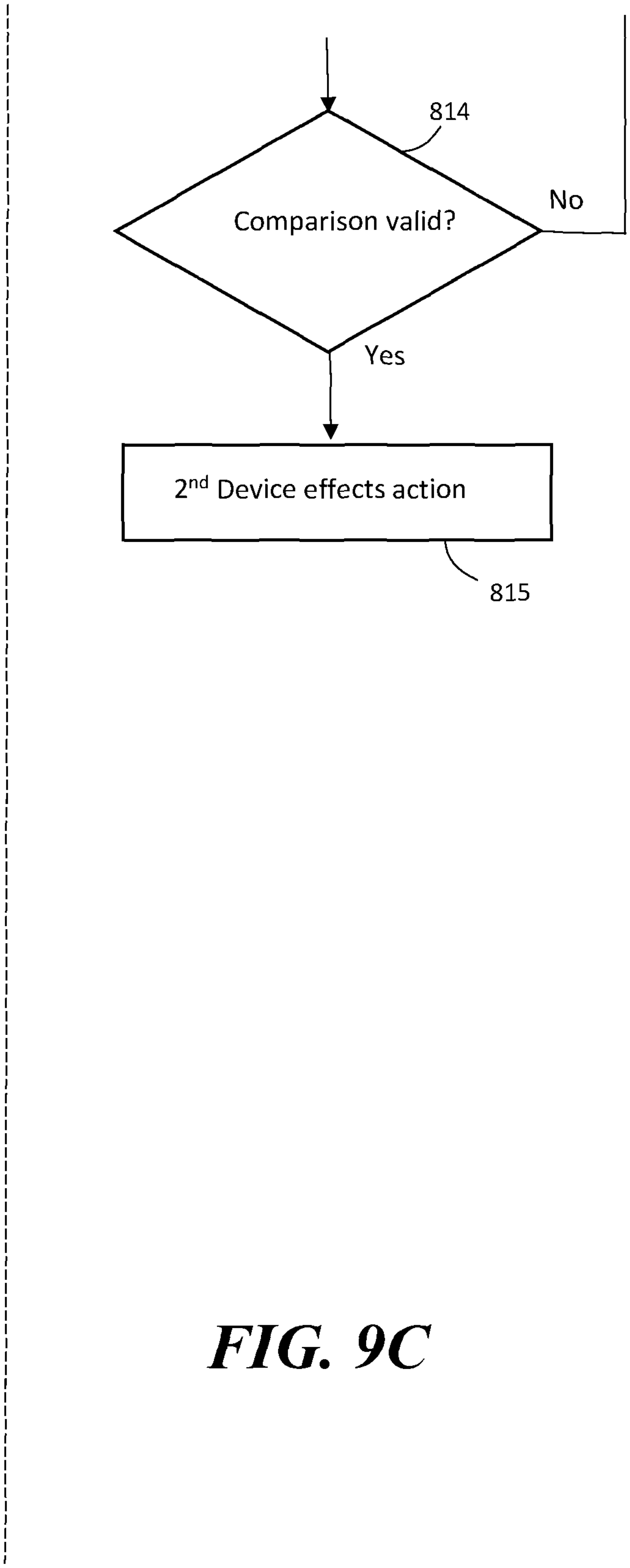

FIGS. 9A, 9B, and 9C are interconnected flow charts that demonstrate operation of a second device by a learned first device. In this example, a first device (such as a handheld or in-vehicle control device) commands a second device (such as a garage door operator) to take or effect performance of an action through encrypted transmissions of variable codes.

Initially, the first and second devices both have stored in their memories a first fixed code and first variable code from the immediately previous operation involving the first device. When the first device is activated by a user in a manner intended to cause an action by the second device, such as by pressing an activation button (step 801), the first device changes the first variable code according to a preset algorithm (such as by incrementing a rolling code) and creates a first message that includes a first fixed code corresponding to the first device and a first changed version of the first variable code. The changed variable code is stored in the memory of the first device, and is also encrypted using one or more encryption methods and transmitted to the second device (step 802). Other information associated with the first device, such as a payload relating to a DIP switch configuration of the first device, may also be included in or accompany the first encrypted message transmitted to the second device in step 802. After transmission of information to the second device, the initial value of the rolling code may be optionally deleted from the first device memory. The first device may optionally also determine a time window or delay in which it expects to receive a response. The time window may be determined from one or both of: the rolling code values or a portion thereof; or from the first encrypted message or a portion thereof. The time window may represent a relative time period (e.g. beginning and end points at specific time intervals from a specific action such as the initial button press or the transmission of the first encrypted signal) or an absolute time period (e.g. based on time values according to a time device such as an oscillator or real time clock (RTC) of the first device (or in communication with the first device) that is synchronized with a time device of the second device (or in communication with the second device)).

The second device, which has been placed in operation mode and awaiting signals (step 803), receives the first encrypted message from the first device, decrypts the message to obtain the first fixed code and first changed version of the first variable code (step 804). The second device then compares the first fixed code and changed first variable code received from the first device to expected values based on stored code values and attempts to validate (step 805) the first fixed code ensure that the first device is a learned device, and also validates the changed version of the first variable code by comparing the changed version of the first variable code to the previous version of the variable code and determining if the changed version of the first variable code matches an expected value. If the first fixed code and first changing code from the first encrypted message are not validated, communication between the devices ends. If the second device confirms that the first fixed code is associated with a learned device and the changed first variable code has been properly changed relative to the previous version of the first variable code, the second device stores the new values for the first fixed code and changed first variable code in a memory (step 806).

The second device also determines if the first device was associated with a single-sided learning process (SS) or dual-sided learning process (DS) (step 807) in order to decide how to proceed in responding to the first device. The learning process (see FIGS. 5A-5C) associated with the first device may determine whether the first device validates incoming messages from the second device by comparison to stored values, or alternatively new instructions may be generated in a similar manner to that described in connection with the pairing process. The second device may determine whether the first device should attempt to validate the response from the second device by reference to the first fixed code, another portion of the first encrypted message, a different stored value from the learning process or a previous operation, some portion or characteristic of the first encrypted message received at step 804, other information received from the first device, or other methods. The second device then transmits (step 808) a response comprising a second encrypted message derived from a second fixed code corresponding to the second device and changed version of a second rolling code that is independent from the first changing code and represents a modified version of the second changing code from the immediately previous operation. These values also are stored in the second device's memory. If the first device is associated with a single-sided learning process (SS), the second encrypted message contains or is accompanied by an instruction not to store the second fixed code or changed second variable code (step 808A). If the first device is associated with a dual-sided learning process (DS), the second encrypted message contains or is accompanied by an instruction to store the second fixed code or changed second variable code (step 808B).

The first device then receives and decrypts the second fixed code and second variable code (step 809). The first device optionally may perform validation of the second encrypted message prior to decryption, such as by confirming that the second encrypted message was received within an expected time window relative to activation of the first device (step 801) or other methods of validation.

The first device then determines (step 810) whether an instruction not to validate the response was received from the second device. If the first device received an instruction from the second device to validate the response (or is not instructed to avoid validating the response, depending on the default protocol), the first device will compare the second fixed code to a stored value; compare the changed second variable code to a stored second variable code to determine if the changed version of the second variable code matches an expected value derived from the stored version of the second variable code; further modify the changed second variable code to create a twice changed version of the second variable code; and store the twice changed version of the second variable code (step 810A). On the other hand, if the first device was instructed not to validate the response, the first device simply modifies the changed second variable code without validating the received fixed or variable codes (step 810B). In each scenario, the first device then encrypts the first fixed code and twice changed version of the second variable code to assemble a third encrypted message and transmits the third encrypted message to the second device (step 811). The second device receives and decrypts the first fixed code and twice changed second variable code (step 812), compares them to stored versions (step 813), and determines if they are valid (step 814). If the first fixed code and twice changed second variable code are validated, the second device effects performance of an action such as moving a barrier (step 815). If one or both codes are not validated, communication with the first device is terminated and the second device returns to the ready state.

The operation mode as shown in FIGS. 9A-9C may be performed on the same frequency as learn mode as shown in FIGS. 5A-5C, and may utilize multiple frequencies. In some embodiments the first device and the second device communicate wirelessly in the operation mode and/or the learn mode via one or more frequencies, channels, bands, and radio physical layers or protocols including but not limited to, for example, 300 MHz-400 MHz, 900 MHz, 2.4 GHz, Wi-Fi/WiLAN, Bluetooth, Bluetooth Low Energy (BLE), 3GPP GSM, UMTS, LTE, LTE-A, 5G NR, proprietary radio, and others. In other embodiments, the first device and the second device communicate in the operation mode and/or the learn mode via a wired connection and various protocols including but not limited to one or more of wire serial communication, Universal Serial Bus (USB), Inter-integrated Circuit ($I^2C$) protocol, Ethernet, control area network (CAN) vehicle bus, proprietary protocol, and others. In some embodiments, the maximum distance between the first device and second device may vary between learn mode and operation mode, while in other modes the maximum range will be the same in both modes due to variation in range from interference.

Figure 10:
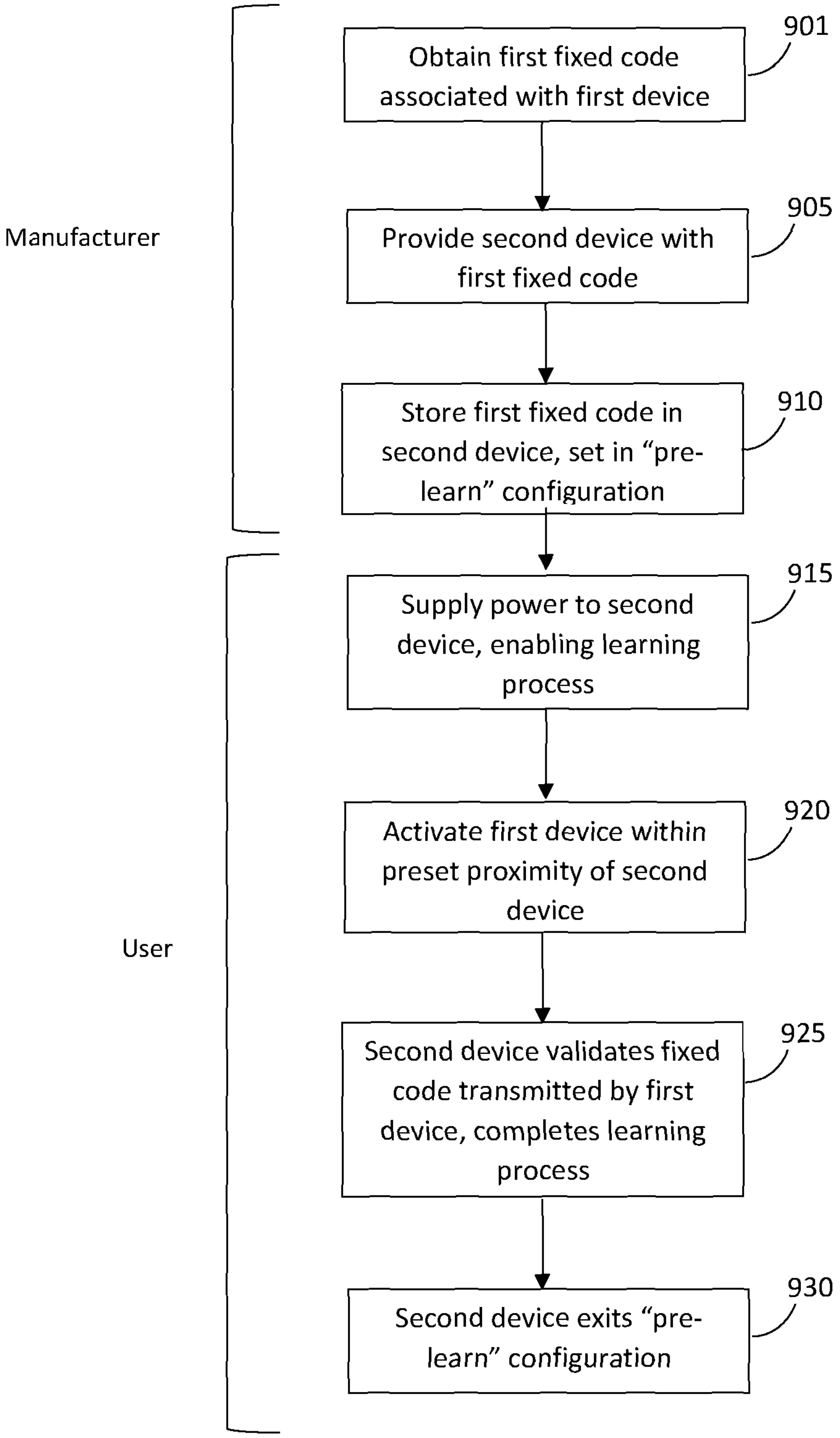
FIG. 10 is a flow diagram showing illustrating one example of a pairing process utilizing a pre-learned device.

In some forms, a pairing method may be simplified so that it is not necessary to activate one or more manual DIP switches or otherwise set one or both devices to a learn mode in order to effect pairing of devices. In the context of an overhead garage door opener, the present simplified pairing method eliminates the need to program a control device (e.g., a handheld transmitter) to a learn mode and/or the need to take steps such as climb a ladder and manually activate the learn mode of the garage door opener. FIG. 10 illustrates one example of a simplified pairing method that utilizes a pre-learned device for pairing with another device. In the illustrated form, a manufacturer performs a small number of steps to place a device in a "pre-learn" configuration, and then a user or purchaser of the device actuates another device to automatically initiate the pairing function. The pre-learn configuration reduces the time spent pairing for the manufacturer and allows the user to pair the devices with a single action, such as a single push of a single button. In the embodiment illustrated in FIG. 10, the manufacturer obtains a fixed code stored in a memory coupled to a first device (step 901). This fixed code in some forms may have been, for instance, programmed into a memory located within the first device, or alternatively accessible by the first device through a physical or wireless connection. In some forms, the fixed code of the first device is also placed on a bar code or other scannable element affixed to the exterior of the first device in order to make the first fixed code readily available without activation of the first device. The first device may be, for instance, a control device such as a transmitter for a movable barrier operator system. The fixed code of the first device may be obtained in any manner, for instance by scanning a code element located on the first device with an optical scanner, communicating with the first device via radio frequencies, connecting the first device to a physical computing device or local network, reading a label of the first device and manually inputting information to another device, or any other known manner of obtaining information from a transmitter device. In some forms, determining the first fixed code by scanning a bar code or other optical recognition means is advantageous by eliminating the possibility of radio frequency interference issues during the manufacturing process.

A second device is then provided with the first device's fixed code (step 905) during the manufacturing process. Any manner of providing the fixed code may be employed, for instance by transmitting the code to the second device via radio frequencies or a hard wire connection, manual entry of the code, or any other method. The fixed code is stored in the second device, and the second device is set in a "pre-learn" configuration (step 910) wherein receipt of an incoming transmission of a valid type will automatically initiate a learning process. The second device is then powered down or otherwise prevented from receiving transmissions in order to avoid accidentally triggering a learning process. The first and second devices are packaged together and sold as a system, allowing a person other than a manufacturer to complete the learning process.

A user, such as an installer or purchaser of the first and second devices is then able to easily effect a pairing process in which one or both of the first and second devices learn the other device by exchanging fixed and variable codes, pairing the devices to one another. In the illustrated embodiment, the user energizes or otherwise turns on the second device by supplying power from an electrical source (step 915), which automatically enables a learning process due to the second device being set in the pre-learn configuration. The user then activates the first device in range of the second device (step 920), causing the second device to receive a message that includes the first fixed code and a first variable code. The message sent by the first device to the second device may optionally include additional information, such as a payload representative of the configuration of a DIP switch of the first device. In some forms, the DIP switch may be an array or series of switches, so that the payload is representative of the overall configuration of a plurality of DIP switches.

In the pre-learn configuration, the second device is configured to automatically store a first variable code upon confirming that the first variable code is associated with the stored fixed code of the first device, and then provide a response that comprises a second fixed code associated with the second device, initiating a learning protocol between the first and second device (step 925). The learning protocol may utilize various steps and/or encryption methods as discussed above. For instance, an actuation of the first device may result in proceeding directly to step 457 of the learning process illustrated in FIGS. 5A-5C due to the second device being set to a pre-learn configuration and allows the first and second devices to then proceed through the remaining steps of that process. The second device then exits (step 930) the pre-learn configuration to prevent subsequent activations of the first device or another similar device from initiating the learning protocol. The second device may be configured to exit the pre-learn configuration upon, for instance, confirmation that the first and second devices are paired or the expiration of a time window initiated upon activation of the second device or upon receipt of a first message from the first device.

In some embodiments, a pairing function between a first device and pre-learned second device is achieved by receiving at the second device a first encrypted message that includes at least a first fixed code and a first variable code; validating the first fixed code by comparing the first fixed code to stored values; storing by the second device the first variable code upon validation of the first fixed code without comparing the first variable code to stored values; transmitting a response from the second device, wherein the response comprises a second encrypted message comprising a second fixed code; receiving and storing by the first device the second fixed code; sending by the first device a third encrypted message comprising the first fixed code and a changed version of the fixed variable code; receiving by the second device the third encrypted message comprising at least the first fixed code and a changed version of the first variable code; validating by the second device the third encrypted message by comparing the first fixed code and the changed version of the first variable code to stored code values from the first encrypted message; transmitting by the second device in response to validating the third encrypted message a fourth encrypted message including the second fixed code and a second variable code; and storing by the first device the second fixed code and second variable code.

Figure 11:
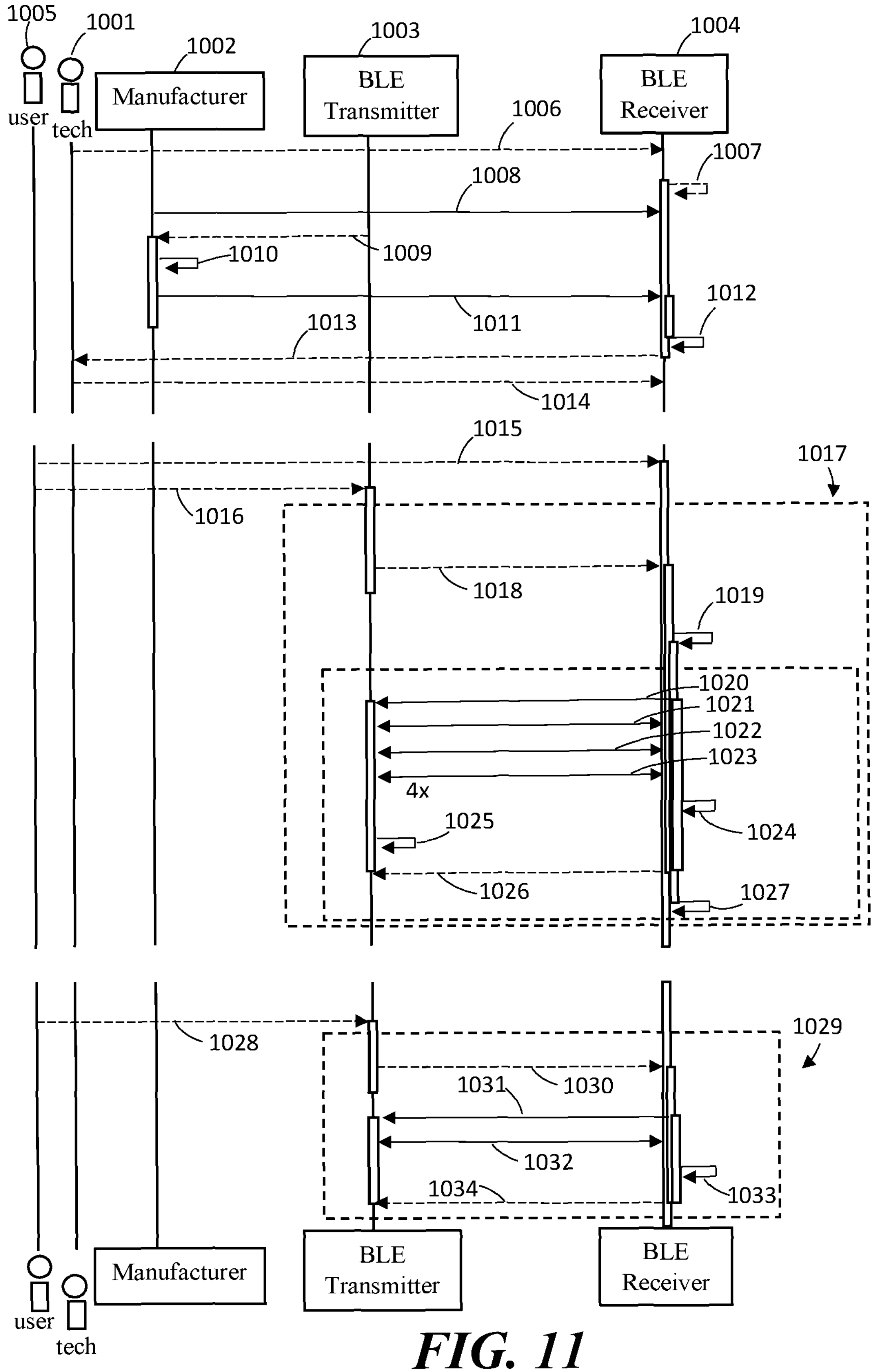
FIG. 11 is a flow diagram illustrating another example of a pairing process utilizing a pre-learned device that is set to a pre-learned configuration by a manufacturer.

FIG. 11 illustrates another example of a pairing method. In FIG. 11, a technician 1001 at a manufacturer 1002 (or an assembly plant or the like) places a Bluetooth Low Energy (BLE) receiver 1004 (e.g. a garage door operator) into a "pre-learn" configuration so that a user 1005 of the device actuates a BLE transmitter 1003 to automatically initiate a pairing function after purchase and/or installation. In the embodiment illustrated in FIG. 11, the technician 1001 places 1006 the receiver 1004 into a test fixture and provides power 1007 or otherwise causes power to be applied to the receiver 1004. Information, such as a device ID and changing code for security purposes are seeded 1008 into the receiver 1004. The manufacturer then obtains 1009 information from the transmitter 1003, such as via scanning a barcode or QR code associated with the transmitter, to identify 1010 a fixed code that identifies the transmitter. The manufacturer 1002 then provides 1011 the transmitter's fixed code, and potentially other information regarding the transmitter, to the receiver 1004 through the test fixture or another wireless or wired connection. The transmitter's fixed code is stored 1012 in the receiver 1004, and the receiver 1004 is powered down 1013 and removed 1014 from the test fixture e.g. by the technician 1001 such that the receiver and transmitter may be packaged for shipment and sale. The BLE receiver 1004 is now set in a "pre-learn" configuration wherein the first receipt of an incoming transmission with a fixed code matching the code stored at step 1012 will automatically initiate a learning process. Powering down the receiver prevents inadvertently triggering the learning process during shipment.

A user 1005 then (e.g. after purchase and/or installation of the receiver) initiates learning between the transmitter and receiver by supplying power 1015 to the receiver 1004 (so that the receiver is capable of receiving signals) and activating 1016 the transmitter 1003 to begin a learning process or protocol 1017. Activation of the transmitter causes the transmitter to advertise 1018 its presence to other devices, and the advertisement, which includes the transmitter's fixed code earlier stored by the receiver, will be recognized by the receiver 1004, causing the receiver to enter a learning mode 1019. In learning mode, the receiver connects 1020 to the transmitter, and generates or initiates a session 1021 between the devices. Upon verifying 1022 that the transmitter is authorized to communicate with the receiver, the transmitter and receiver enter into a communication sequence 1023 (e.g. a process similar to that described above in connection with FIGS. 5A-C) in which messages including fixed and changing codes are exchanged. The receiver 1004 saves 1024 information relating to the transmitter (e.g. a fixed code and changing code), and, if the learning process is bidirectional, the transmitter saves 1025 information relating to the receiver. The transmitter and receiver then disconnect 1026 and the receiver switches 1027 to operational mode. Subsequent activation 1028 of the transmitter 1003 then initiates an operational mode 1029, where advertisement 1030 from the transmitter 1003 causes the receiver 1004 to connect 1031 to the transmitter 1003 and then engage in a message exchange 1032 (e.g. similar to that shown in FIGS. 9A-C) that, if successful, causes the receiver to effect 1033 an action, such as moving a barrier, and then disconnect 1034 the session between the transmitter and receiver.

Figure 12:
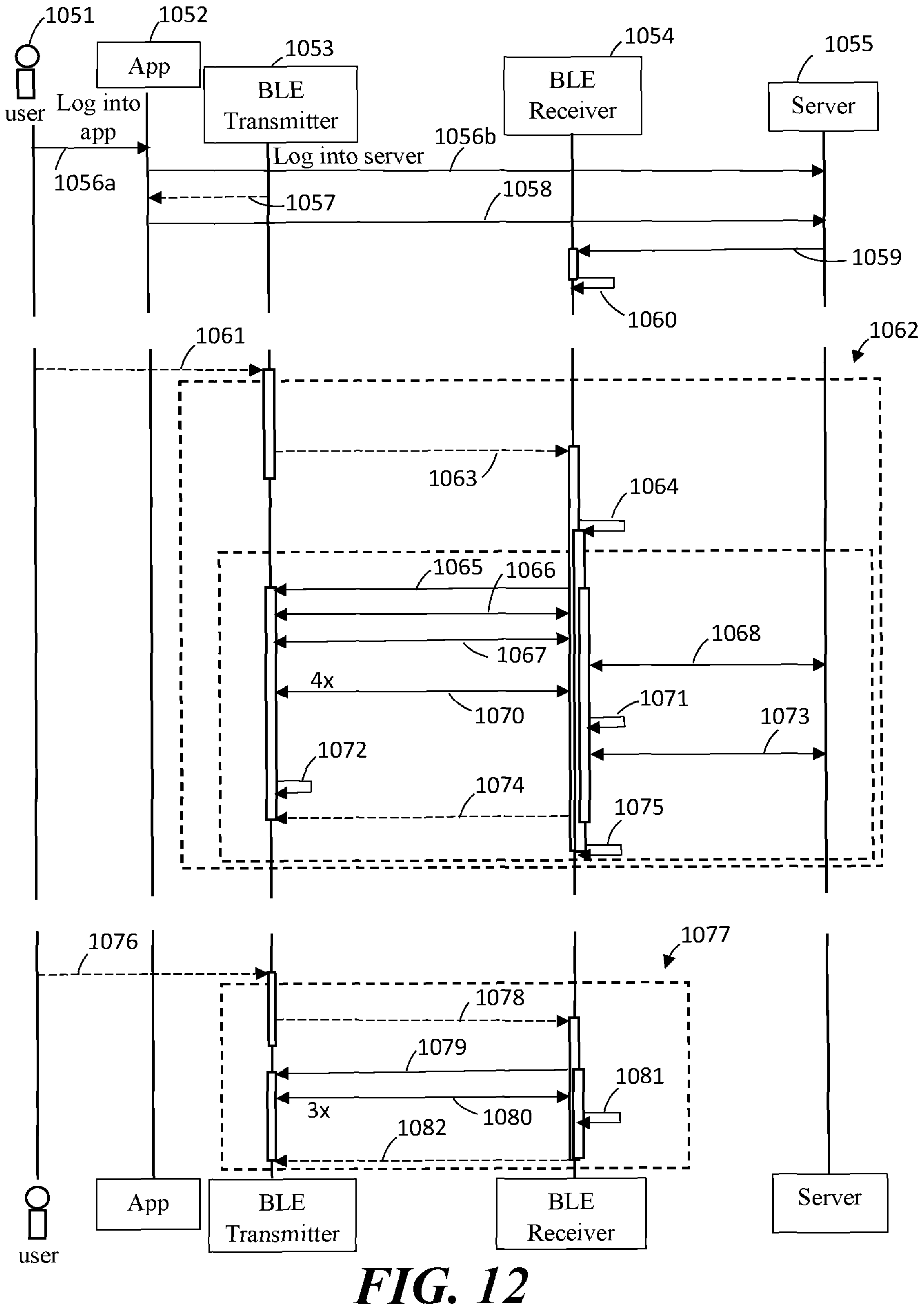
FIG. 12 is a flow diagram illustrating another example of a pairing process utilizing an application located on a user device to place a receiver in a pre-learn configuration.

FIG. 12 illustrates another example of a pairing method facilitated by use of an application on a user device such as a desktop computer, laptop computer, smartphone, tablet, or the like. In FIG. 12, a user 1051 logs into 1056*a* and interacts with an application 1052 'App' on a user device to contact a server 1055. The user 1051 may also log into 1056*b* the server 1055 through the app in some embodiments. The user causes acquisition of an identification code (such as a fixed code of the type described in various embodiments herein) of a transmitter 1053 (which is heretofore unknown by the receiver 1054) to the application. Information may be transferred to, or otherwise acquired by, the application by scanning 1057 a barcode (or QR code or the like) located on the transmitter with the application using a camera of the user device (e.g. smartphone), as shown, or by manually inputting the identification code, receiving a wireless signal, performing an optical character recognition 'OCR' process on human-readable indicia, or other method. The application 1052 then causes the transmitter 1053 to be associated with the BLE receiver 1054 via the transmitter identification code by transmitting 1058 information regarding the identification code and association (and optionally other information) to the server 1055. The server 1055 communicates 1059 the transmitter's identification code (and optionally other information) to the receiver 1054, placing the receiver 1054 in a "pre-learn" configuration and causing the receiver to store 1060 the transmitter's identification code (and optionally other information).

Once the receiver 1054 is placed in pre-learn mode by receiving information from the server 1055 regarding the identification code of the transmitter 1053, the next activation 1061 of the transmitter 1053 within range of the receiver 1054 will initiate a learning protocol 1062 similar to learning protocol 1017 described in connection with FIG. 11. While certain steps included in the embodiment shown in FIG. 12 provide additional layers of security and are absent from the description of FIG. 11, learning protocol 1062 is generally interchangeable with learning protocol 1017 from FIG. 11, and fewer or additional security features may be employed as desired. In the illustrated form of learning protocol 1062, an advertisement 1063 from the BLE transmitter 1053 is recognized by the receiver 1054 and causes the receiver to enter learn mode 1064 upon recognizing the transmitter's fixed identification code and determining that the fixed code matches the value stored earlier at operation 1060. The receiver then connects 1065 to the transmitter, generating or initiating a session 1066 between the devices. In the illustrated embodiment, once connected the transmitter provides authorization credentials 1067 to the receiver, and the receiver performs a credential revocation check 1068 by communicating with the server to determine if the credentials of the transmitter have been revoked. Other methods of determining that the transmitter is an authorized device are also possible, for example by checking a revocation list, approved device list, or other information stored in the user device or receiver. If the transmitter's credentials have not been revoked, the transmitter and receiver will then exchange 1070 a series of messages (e.g. in a process similar to that described in connection with FIGS. 5A-C), resulting in the receiver storing 1071 information (e.g. fixed and changing codes) relating to the transmitter and, if the learning process is bidirectional, the transmitter storing 1072 information relating to the receiver. The receiver also communicates 1073 with the server to finalize the addition, to an account of the user, of the transmitter as a learned device. Such addition may be reflected in or otherwise indicated by the app 1052 as executed by the user device. The transmitter and receiver then disconnect 1074 and the receiver switches 1075 to operational mode. Subsequent activation 1076 of the transmitter then initiates an operational mode 1077 where advertisement 1078 by the transmitter 1053 causes the receiver 1054 to connect 1079 to the learned transmitter 1053 and then engage in an exchange of messages 1080 (e.g. similar to that shown in FIGS. 9A-C) that, if successful, causes the receiver to effect 1081 an action such as moving a barrier. The transmitter 1053 and receiver 1054 then disconnect 1082 until the transmitter 1053 is activated again.

While there has been illustrated and described particular embodiments of the present disclosure, those skilled in the art will recognize that a wide variety of modifications, alterations, and combinations can be made with respect to the above described examples without departing from the scope of the present disclosure, and that such modifications, alterations, and combinations are to be viewed as being within the ambit of the inventive concept.

What is claimed is:

1. A method of pairing a first device and a second device to effect secure communication between the first device and the second device, the method comprising:

receiving, by the second device while the second device is in a learning mode, a first message from the first device, wherein the first message includes at least a first fixed code and a first changing code;

storing, by the second device, code values associated with the first message;

determining, by the second device, whether to instruct the first device to store information associated with a second message in accordance with which one of a plurality of learn paths is selected by the second device based on at least a portion of the first message;

transmitting, by the second device, the second message comprising a second fixed code, at least a portion of the second message instructing the first device regarding storing of the information associated with the second message based on the selected one of the plurality of learn paths;

receiving, by the second device, a third message including at least the first fixed code and a changed version of the first changing code;

validating, by the second device, the third message by comparing the first fixed code and the changed version of the first changing code to the stored code values associated with the first message; and transmitting, by the second device in response to validating the third message, a fourth message including the second fixed code and a second changing code.

2. The method of claim 1, wherein the second device determines whether to instruct the first device to store the information associated with the second message based on a classification of the first device.

3. The method of claim 1, wherein the second device uses at least a portion of the first message in determining whether to instruct the first device to store the information associated with the second message.

4. The method of claim 3, wherein the second device uses at least a portion of the first fixed code in determining whether to instruct the first device to store the information associated with the second message.

5. The method of claim 1, wherein the second device instructs the first device regarding storing of the information associated with the second message via an instruction portion of the second message, the instruction portion comprising either: a) an instruction to store the information associated with the second message; or b) an instruction not to store the information associated with the second message.

6. The method of claim 1, further comprising determining, by the second device before the transmitting of the second message, a time window during which to transmit the second message to the first device based on at least a portion of the first message.

7. The method of claim 1, wherein the first message includes a first signal including the first fixed code and the first changing code and a second signal including information indicative of whether the first device is capable of storing the information associated with the second message; and wherein determining by the second device whether to instruct the first device to store the information associated with the second message includes determining whether the first device is capable of storing the information associated with the second message based at least in part on the second signal.

8. The method of claim 1, wherein transmitting the second message includes transmitting a first signal including the second fixed code and a second signal instructing the first device regarding storing of the information associated with the second message.

9. The method of claim 1, further comprising entering the learning mode in response to a user input at a user interface of the second device.

10. The method of claim 1, wherein the second device comprises a garage door operator.

11. An apparatus configured to communicate with a device to pair the apparatus to the device, the apparatus comprising:

a communication circuit;

a control circuit operably coupled to the communication circuit; and a computer-readable medium storing instructions executable by the control circuit to:

receive, while the apparatus is in a learning mode, a first message from the device, wherein the first message includes at least a first fixed code and a first changing code;

store code values associated with the first message;

determine whether to instruct the device to store information associated with a second message in accordance with which one of a plurality of learn paths is selected by the control circuit based on at least a portion of the first message;

transmit, by the communication circuit, the second message comprising a second fixed code, at least a portion of the second message instructing the device regarding storing of the information associated with the second message based on the selected one of the plurality of learn paths;

receive, by the communication circuit, a third message including at least the first fixed code and a changed version of the first changing code;

validate the third message by comparing the first fixed code and the changed version of the first changing code to the stored code values associated with the first message; and transmit, by the communication circuit, a fourth message including the second fixed code and a second changing code in response to validating the third message.

12. The apparatus of claim 11, wherein the determining whether to instruct the device to store the information associated with the second message is based on a classification of the apparatus.

13. The apparatus of claim 11, wherein the computer-readable medium further stores instructions executable by the control circuit to use at least a portion of the first message in determining whether to instruct the device to store the information associated with the second message.

14. The apparatus of claim 13, wherein the computer-readable medium further stores instructions executable by the control circuit to use at least a portion of the first fixed code in determining whether to instruct the device to store the information associated with the second message.

15. The apparatus of claim 11, wherein the computer-readable medium further stores instructions executable by the control circuit to instruct the device regarding storing of the information associated with the second message via an instruction portion of the second message, the instruction portion comprising either: a) an instruction to store the information associated with the second message; or b) an instruction not to store the information associated with the second message.

16. The apparatus of claim 11, wherein the computer-readable medium further stores instruction executable by the control circuit to determine, before the transmitting of the second message, a time window during which to transmit the second message to the device based on at least a portion of the first message.

17. The apparatus of claim 11, wherein the first message includes a first signal including the first fixed code and the first changing code and a second signal including information indicative of whether the device is capable of storing the information associated with the second message; and wherein determining whether to instruct the device to store the information associated with the second message includes determining whether the device is capable of storing the information associated with the second message based at least in part on the second signal.

18. The apparatus of claim 11, wherein transmitting the second message includes transmitting a first signal including the second fixed code and a second signal instructing the device regarding storing of the information associated with the second message.

19. The apparatus of claim 11, wherein the computer-readable medium further stores instructions executable by the control circuit to enter the learning mode in response to a user input at a user interface of the apparatus.

20. The apparatus of claim 11, wherein the apparatus comprises a garage door operator.

* * * * *